United States Patent [19]

Sakakibara et al.

[11] Patent Number: 5,392,443
[45] Date of Patent: Feb. 21, 1995

[54] VECTOR PROCESSOR WITH A MEMORY ASSIGNED WITH SKEWED ADDRESSES ADAPTED FOR CONCURRENT FETCHING OF A NUMBER OF VECTOR ELEMENTS BELONGING TO THE SAME VECTOR DATA

[75] Inventors: Tadayuki Sakakibara, Kunitachi; Katsuyoshi Kitai, Hadano; Yasuhiro Inagami, Kodaira; Yoshiko Tamaki, Kunitachi; Teruo Tanaka, Hachioji; Tadaaki Isobe, Hadano; Shigeko Yazawa, Hadano; Masanao Ito, Kokubunji, all of Japan

[73] Assignee: Hitachi, Ltd., Tokyo, Japan

[21] Appl. No.: 855,056

[22] Filed: Mar. 19, 1992

[30] Foreign Application Priority Data

Mar. 19, 1991 [JP] Japan .................................. 3-054435

[51] Int. Cl.[6] .............................................. G06F 15/16
[52] U.S. Cl. ...................................... 395/800; 364/736;
364/232.21; 364/228.1; 364/DIG. 1; 395/725
[58] Field of Search ............... 395/375, 800, 725; 364/736

[56] References Cited

U.S. PATENT DOCUMENTS

| 4,777,593 | 10/1988 | Yoshida | 364/736 |
| 4,827,407 | 5/1989 | Nakatani | 395/800 |
| 4,843,543 | 6/1989 | Isobe | 395/425 |
| 4,875,161 | 10/1989 | Lahti | 395/425 |
| 5,214,769 | 5/1993 | Uchida et al. | 395/425 |
| 5,276,902 | 1/1994 | Nakatani et al. | 395/800 |

Primary Examiner—Alyssa H. Bowler
Assistant Examiner—Mehmet Geckil
Attorney, Agent, or Firm—Antonelli, Terry, Stout & Kraus

[57] ABSTRACT

A plurality of storage control units are employed in the storage control unit section; moreover, two requester modules are adopted in association with these storage control units. Each memory module is constituted with as many access bank groups as there are storage control units. The access bank groups operate in concurrent fashion and are accessible from any one of the storage control units. In the element assignment, a plurality of request control units in each requester module and a plurality of vector data controllers in each vector register unit are respectively assigned with serial numbers beginning from zero. For a vector data controller, a number assigned thereto is divided by the request module count to attain a remainder such that the vector data controller is assigned to a request module having a number identical to the value of the remainder. Furthermore, a request queue is disposed at a stage preceding each priority unit and a request send-out unit is arranged to store therein a state of the request queue and to control a request transmission from each request control unit. Addresses are assigned to the respective memory modules, bank groups, and banks according to skew schemes respectively suitable therefor.

43 Claims, 35 Drawing Sheets

| RM0 | RQ0 | VDC0 |
| | RQ1 | VDC2 |
| | RQ2 | VDC4 |
| | RQ3 | VDC6 |
| RM1 | RQ4 | VDC1 |
| | RQ5 | VDC3 |
| | RQ6 | VDC5 |
| | RQ7 | VDC7 |

FIG.4

| MM# | BANK GROUP# | BANK# | ADDRESS | | | |
|---|---|---|---|---|---|---|
| 0 | 0 | 0 | 0 | 34 | | |
| | | 1 | 8 | 42 | 68 | |
| | | 2 | 19 | 49 | | |
| | | 3 | 27 | 57 | | |
| | 1 | 4 | 4 | 38 | | |
| | | 5 | 12 | 46 | 64 | |
| | | 6 | 23 | 53 | | |
| | | 7 | 31 | 61 | | |
| 1 | 2 | 8 | 1 | 35 | | |
| | | 9 | 9 | 43 | 69 | |
| | | 10 | 16 | 50 | | |
| | | 11 | 24 | 58 | | |
| | 3 | 12 | 5 | 39 | | |
| | | 13 | 13 | 47 | 65 | |
| | | 14 | 20 | 54 | | |
| | | 15 | 28 | 62 | | |
| 2 | 4 | 16 | 2 | 32 | | |
| | | 17 | 10 | 40 | 70 | |
| | | 18 | 17 | 51 | | |
| | | 19 | 25 | 59 | | |
| | 5 | 20 | 6 | 36 | | |
| | | 21 | 14 | 44 | 66 | |
| | | 22 | 21 | 55 | | |
| | | 23 | 29 | 63 | | |
| 3 | 6 | 24 | 3 | 33 | | |
| | | 25 | 11 | 41 | 71 | |
| | | 26 | 18 | 48 | | |
| | | 27 | 26 | 56 | | |
| | 7 | 28 | 7 | 37 | | |
| | | 29 | 15 | 45 | 67 | |
| | | 30 | 22 | 52 | | |
| | | 31 | 30 | 60 | | |

FIG.5

| MM# | 0 | 1 | 2 | 3 |
|---|---|---|---|---|
| ADDRESS | 0 | 1 | 2 | 3 |
| | 4 | 5 | 6 | 7 |
| | 8 | 9 | 10 | 11 |
| | 12 | 13 | 14 | 15 |
| | 19 | 16 | 17 | 18 |
| | 23 | 20 | 21 | 22 |
| | 27 | 24 | 25 | 26 |
| | 31 | 28 | 29 | 30 |
| | 34 | 35 | 32 | 33 |
| | 38 | 39 | 36 | 37 |
| | 42 | 43 | 40 | 41 |
| | 46 | 47 | 44 | 45 |
| | 49 | 50 | 51 | 48 |
| | 53 | 54 | 55 | 52 |
| | 57 | 58 | 59 | 56 |
| | 61 | 62 | 63 | 60 |
| | 64 | 65 | 66 | 67 |
| | 68 | 69 | 70 | 71 |
| | 72 | 73 | 74 | 75 |
| | 76 | 77 | 78 | 79 |
| | 83 | 80 | 81 | 82 |
| | 87 | 84 | 85 | 86 |
| | 91 | 88 | 89 | 90 |
| | 95 | 92 | 93 | 94 |
| | 98 | 99 | 96 | 97 |
| | 102 | 103 | 100 | 101 |
| | 106 | 107 | 104 | 105 |
| | 110 | 111 | 108 | 109 |
| | 113 | 114 | 115 | 112 |
| | 117 | 118 | 119 | 116 |
| | 121 | 122 | 123 | 120 |
| | 125 | 126 | 127 | 124 |

| MM# | 0 | 1 | 2 | 3 |
|---|---|---|---|---|
| ADDRESS | 128 | 129 | 130 | 131 |
| | 132 | 133 | 134 | 135 |
| | 136 | 137 | 138 | 139 |
| | 140 | 141 | 142 | 143 |
| | 147 | 144 | 145 | 146 |
| | 151 | 148 | 149 | 150 |
| | 155 | 152 | 153 | 154 |
| | 159 | 156 | 157 | 158 |
| | 162 | 163 | 160 | 161 |
| | 166 | 167 | 164 | 165 |
| | 170 | 171 | 168 | 169 |
| | 174 | 175 | 172 | 173 |
| | 177 | 178 | 179 | 176 |
| | 181 | 182 | 183 | 180 |
| | 185 | 186 | 187 | 184 |
| | 189 | 190 | 191 | 188 |
| | 192 | 193 | 194 | 195 |
| | 196 | 197 | 198 | 199 |
| | 200 | 201 | 202 | 203 |
| | 204 | 205 | 206 | 207 |
| | 211 | 208 | 209 | 210 |
| | 215 | 212 | 213 | 214 |
| | 219 | 216 | 217 | 218 |
| | 223 | 220 | 221 | 222 |
| | 226 | 227 | 224 | 225 |
| | 230 | 231 | 228 | 229 |
| | 234 | 235 | 232 | 233 |
| | 238 | 239 | 236 | 237 |
| | 241 | 242 | 243 | 240 |
| | 245 | 246 | 247 | 244 |
| | 249 | 250 | 251 | 248 |
| | 253 | 254 | 255 | 252 |

FIG.6

| MM# | 0 | 1 | 2 | 3 |
|---|---|---|---|---|
| ADDRESS | 256 | 257 | 258 | 259 |
| | 260 | 261 | 262 | 263 |
| | 264 | 265 | 266 | 267 |
| | 268 | 264 | 270 | 271 |
| | 275 | 272 | 273 | 274 |
| | 279 | 276 | 277 | 278 |
| | 283 | 280 | 281 | 282 |
| | 287 | 284 | 285 | 286 |
| | 290 | 291 | 288 | 289 |
| | 294 | 295 | 292 | 293 |
| | 298 | 299 | 296 | 297 |
| | 302 | 303 | 300 | 301 |
| | 305 | 306 | 307 | 304 |
| | 309 | 310 | 311 | 308 |
| | 313 | 314 | 315 | 312 |
| | 317 | 318 | 319 | 316 |
| | 320 | 321 | 322 | 323 |
| | 324 | 325 | 326 | 327 |
| | 328 | 329 | 330 | 331 |
| | 332 | 333 | 334 | 335 |
| | 339 | 336 | 337 | 338 |
| | 343 | 340 | 341 | 342 |
| | 347 | 344 | 345 | 346 |
| | 351 | 348 | 349 | 350 |
| | 354 | 355 | 352 | 353 |
| | 358 | 359 | 356 | 357 |
| | 362 | 363 | 360 | 361 |
| | 366 | 367 | 364 | 365 |
| | 369 | 370 | 371 | 368 |
| | 373 | 374 | 375 | 372 |
| | 377 | 378 | 379 | 376 |
| | 381 | 382 | 383 | 380 |

| MM# | 0 | 1 | 2 | 3 |
|---|---|---|---|---|
| ADDRESS | 384 | 385 | 386 | 387 |
| | 388 | 389 | 390 | 391 |
| | 392 | 392 | 393 | 394 |
| | 396 | 397 | 398 | 399 |
| | 403 | 400 | 401 | 402 |
| | 407 | 404 | 405 | 406 |
| | 411 | 408 | 409 | 410 |
| | 415 | 412 | 413 | 414 |
| | 418 | 419 | 416 | 417 |
| | 422 | 423 | 420 | 421 |
| | 426 | 427 | 424 | 425 |
| | 430 | 431 | 428 | 429 |
| | 433 | 434 | 435 | 432 |
| | 437 | 438 | 439 | 436 |
| | 441 | 442 | 443 | 440 |
| | 445 | 446 | 447 | 444 |
| | 448 | 449 | 450 | 451 |
| | 452 | 453 | 454 | 455 |
| | 456 | 457 | 458 | 459 |
| | 460 | 461 | 462 | 463 |
| | 467 | 464 | 465 | 466 |
| | 471 | 468 | 469 | 470 |
| | 475 | 472 | 473 | 474 |
| | 479 | 476 | 477 | 478 |
| | 482 | 483 | 480 | 481 |
| | 486 | 487 | 484 | 485 |
| | 490 | 491 | 488 | 489 |
| | 494 | 495 | 492 | 493 |
| | 497 | 498 | 499 | 496 |
| | 501 | 502 | 503 | 500 |
| | 505 | 506 | 507 | 504 |
| | 509 | 510 | 511 | 508 |

FIG.7

| MM# | 0 | |
|---|---|---|
| BG# | 0 | 1 |
| ADDRESS | 0 | 4 |
| | 8 | 12 |
| | 19 | 23 |
| | 27 | 31 |
| | 34 | 38 |
| | 42 | 46 |
| | 49 | 53 |
| | 57 | 61 |
| | | 64 |

FIG.8

| MM# | 0 | | | |
|---|---|---|---|---|
| BG# | 0 | | | |
| BNK# | 0 | 1 | 2 | 3 |
| ADDRESS | 0 | 8 | 19 | 27 |
| | 34 | 42 | 49 | 57 |
| | --- | 68 | --- | --- |

FIG.14

| STRIDE | ACCESS PROCESSING PERFORMANCE |
|---|---|
| MULTIPLE OF 256 | 1/32 |
| MULTIPLE OF 128 OTHER THAN THOSE OF 256 | 1/16 |
| MULTIPLE OF 64 OTHER THAN THOSE OF 128 | 1/8 |
| MULTIPLE OF 32 OTHER THAN THOSE OF 64 | 1/4 |
| MULTIPLE OF 16 OTHER THAN THOSE OF 32 | 1/2 |
| OTHERS | 1 |

FIG.15

| MM# | BANK GROUP# | BANK # | ADDRESS | | | |
|---|---|---|---|---|---|---|
| 0 | 0 | 0 | 0 | 61 | | |
| | | 1 | 11 | 36 | | |
| | | 2 | 18 | 47 | 64 | |
| | | 3 | 25 | 54 | | |
| | 1 | 4 | 4 | 57 | | |
| | | 5 | 15 | 32 | | |
| | | 6 | 22 | 43 | | |
| | | 7 | 29 | 50 | | |
| 1 | 2 | 8 | 1 | 62 | | |
| | | 9 | 8 | 37 | | |
| | | 10 | 19 | 44 | | |
| | | 11 | 26 | 55 | | |
| | 3 | 12 | 5 | 58 | | |
| | | 13 | 12 | 33 | | |
| | | 14 | 23 | 40 | | |
| | | 15 | 30 | 51 | | |
| 2 | 4 | 16 | 2 | 63 | | |
| | | 17 | 9 | 38 | | |
| | | 18 | 16 | 45 | | |
| | | 19 | 27 | 52 | | |
| | 5 | 20 | 6 | 59 | | |
| | | 21 | 13 | 34 | | |
| | | 22 | 20 | 41 | | |
| | | 23 | 31 | 48 | | |
| 3 | 6 | 24 | 3 | 60 | | |
| | | 25 | 10 | 39 | | |
| | | 26 | 17 | 46 | | |
| | | 27 | 24 | 53 | | |
| | 7 | 28 | 7 | 56 | | |
| | | 29 | 14 | 35 | | |
| | | 30 | 21 | 42 | | |
| | | 31 | 28 | 49 | | |

FIG.16

| MM# | 0 | |
|---|---|---|
| BG# | 0 | 1 |
| ADDRESS | <u>0</u> | 4 |
| | 11 | 15 |
| | 18 | 22 |
| | 25 | 29 |
| | 36 | <u>32</u> |
| | 47 | 43 |
| | 54 | 50 |
| | 61 | 57 |
| | <u>64</u> | --- |

FIG.17

| MM# | 0 | | | |
|---|---|---|---|---|
| BG# | 0 | | | |
| BNK# | 0 | 1 | 2 | 3 |
| ADDRESS | <u>0</u> | 11 | 18 | 25 |
| | 61 | <u>36</u> | 47 | 54 |
| | --- | --- | <u>64</u> | --- |

FIG. 18

| MM# | 0 | 1 | 2 | 3 |
|---|---|---|---|---|
| ADDRESS | 0 | 1 | (2) | 3 |
| | 4 | 5 | (6) | 7 |
| | 11 | 8 | 9 | (10) |
| | 15 | 12 | 13 | (14) |
| | (18) | 19 | 16 | 17 |
| | (22) | 23 | 20 | 21 |
| | 25 | (26) | 27 | 24 |
| | 29 | (30) | 31 | 28 |
| | 32 | 33 | (34) | 35 |
| | 36 | 37 | (38) | 39 |
| | 43 | 40 | 41 | (42) |
| | 47 | 44 | 45 | (46) |
| | (50) | 51 | 48 | 49 |

FIG.19

| STRIDE | ACCESS PROCESSING PERFORMANCE |
|---|---|
| MULTIPLE OF 128 | 1/32 |
| MULTIPLE OF 64 OTHER THAN THOSE OF 128 | 1/16 |
| MULTIPLE OF 32 OTHER THAN THOSE OF 64 | 1/8 |
| MULTIPLE OF 16 OTHER THAN THOSE OF 32 | 1/4 |
| MULTIPLE OF 8 OTHER THAN THOSE OF 16 | 1/2 |
| OTHERS | 1 |

FIG.20

| | | |
|---|---|---|
| RM0 | RQ0 | VDC0 |
| | RQ1 | VDC1 |
| | RQ2 | VDC2 |
| | RQ3 | VDC3 |
| RM1 | RQ4 | VDC4 |
| | RQ5 | VDC5 |
| | RQ6 | VDC6 |
| | RQ7 | VDC7 |

FIG.21

| MM# | 0 | 1 | 2 | 3 |
|---|---|---|---|---|
| ADDRESS | 0 | 1 | 2 | 3 |
| | 4 | 5 | 6 | 7 |
| | 11 | 8 | 9 | 10 |
| | 15 | 12 | 13 | 14 |
| | 18 | 19 | 16 | 17 |
| | 22 | 23 | 20 | 21 |
| | 25 | 26 | 27 | 24 |
| | 29 | 30 | 31 | 28 |
| | 32 | 33 | 34 | 35 |
| | 36 | 37 | 38 | 39 |
| | 43 | 40 | 41 | 42 |
| | 47 | 44 | 45 | 46 |
| | 50 | 51 | 48 | 49 |

FIG. 22

| STRIDE | 1 | 2 | 3 | 4 | 5 | 6 | 7 | 8 | 9 | 10 | 11 | 12 | 13 | 14 | 15 | 16 | 17 | 18 | 19 |
|---|---|---|---|---|---|---|---|---|---|---|---|---|---|---|---|---|---|---|---|
| ACCESS PROCESSING PERFORMANCE | 1 | 1/2 | 1 | 1/2 | 1 | 2/3 | 1 | 1/2 | 1 | 1 | 1 | 1/2 | 1 | 2/3 | 1 | 1/4 | 1 | 1/2 | 1 |

| 20 | 21 | 22 | 23 | 24 | 25 | 26 | 27 | 28 | 29 | 30 | 31 | 32 |
|---|---|---|---|---|---|---|---|---|---|---|---|---|
| 1 | 1 | 2/3 | 1 | 1/2 | 1 | 1 | 1 | 1/2 | 1 | 2/3 | 1 | 1/4 |

FIG.23

| RQ# | 0 | 1 | 2 | 3 | 4 | 5 | 6 | 7 |
|---|---|---|---|---|---|---|---|---|
| ADDRESS | 0 | 30 | 60 | 90 | 15 | 45 | 75 | 105 |
| | 120 | 150 | 180 | 210 | 135 | 165 | 195 | 225 |
| | 240 | 270 | 300 | 330 | 255 | 285 | 315 | 345 |
| | 360 | 390 | 420 | 450 | 375 | 405 | 435 | 465 |
| | 480 | 510 | 540 | 570 | 495 | 525 | 555 | 585 |
| | 600 | 630 | 660 | 690 | 615 | 645 | 675 | 705 |
| | 720 | 750 | 780 | 810 | 735 | 765 | 795 | 825 |
| | 840 | 870 | 900 | 930 | 855 | 885 | 915 | 945 |
| | | | | | | | | |

FIG. 29

| | | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|---|
| PR0 | RQ0 | 0 | | | | | | | | | | | | | | | |
| | RQ1 | | | | | | | 175 | 203 | | | 224 | | | | 399 | 427 |
| | RQ2 | | | | | | | | 182 | 210 | 196 | | | | | | 406 |
| | RQ3 | | | | | | | | | 189 | 217 | | | | | | |
| PR1 | RQ0 | | | | | | | | | 168 | | | | | | | 364 |
| | RQ1 | | | 28 | 63 | 119 | 147 | 154 | 140 | | | | | 343 | 371 | | |
| | RQ2 | | 35 | | 70 | | 126 | 133 | | | | | | | 350 | 378 | |
| | RQ3 | | | 42 | 91 | 77 | 84 | 112 | | | | | | | | 357 | |
| PR2 | RQ0 | | | | | 56 | | | 161 | | | | | | 308 | 336 | 385 |
| | RQ1 | | | | | 98 | 105 | | | | | 287 | 315 | | | | |
| | RQ2 | | | | | | | | | | | | 294 | 322 | 329 | | |
| | RQ3 | | | | | | | | | 231 | | | | 301 | | | |
| PR3 | RQ0 | | | | | | | | | | 259 | 266 | | 280 | | | |
| | RQ1 | 7 | | | | | | | | | 238 | | 252 | | | | |
| | RQ2 | 14 | | | 49 | | | | | | | 254 | | | | | |
| | RQ3 | 21 | | | | | | | | | | | 273 | | | | |
| PROCESSING REQUEST COUNT | | 2 | 1 | 2 | 2 | 3 | 3 | 4 | 4 | 4 | 4 | 4 | 4 | 4 | 4 | 4 | 4 |

MACHINE CYCLE →

FIG. 30 PRIOR ART

| MM# | MM0 | MM1 | MM2 | MM3 |
|---|---|---|---|---|
| ADDRESS | <u>0</u> | 1 | 2 | 3 |
| | <u>4</u> | 5 | 6 | 7 |
| | <u>8</u> | 9 | 10 | 11 |
| | <u>12</u> | 13 | 14 | 15 |
| | <u>16</u> | 17 | 18 | 19 |
| | <u>20</u> | 21 | 22 | 23 |
| | <u>24</u> | 25 | 26 | 27 |
| | <u>28</u> | 29 | 30 | 31 |
| | | | | |

UNDERLINED LOCATIONS; ACCESSED WITH ADDRESS HAVING STRIDE "4"

FIG. 31

| STRIDE | MULTIPLE OF 4 | MULTIPLE OF 2 EXCEPTING MULTIPLE OF 2 | OTHERS |
|---|---|---|---|
| ACCESSING EFFICIENCY | 1/4 | 1/2 | 1 |

FIG.33 PRIOR ART

| MM# | 0 | 1 | 2 | 3 |
|---|---|---|---|---|
| ADDRESS | <u>0</u> | 1 | 2 | 3 |
| | 7 | <u>4</u> | 5 | 6 |
| | 10 | 11 | <u>8</u> | 9 |
| | 13 | 14 | 15 | <u>12</u> |
| | <u>16</u> | 17 | 18 | 19 |
| | 23 | <u>20</u> | 21 | 22 |
| | 26 | 27 | <u>24</u> | 25 |
| | 29 | 30 | 31 | <u>28</u> |
| | <u>32</u> | 33 | 34 | 35 |
| | 48 | 49 | 50 | 51 |

FIG.34 PRIOR ART

| MM# | 0 | 1 | 2 | 3 |
|---|---|---|---|---|
| ADDRESS | 0 | 1 | 2 | 3 |
| | 4 | 5 | 6 | 7 |
| | 11 | 8 | 9 | 10 |
| | 15 | 12 | 13 | 14 |
| | 18 | 19 | 16 | 17 |
| | 22 | 23 | 20 | 21 |
| | 25 | 26 | 27 | 24 |
| | 29 | 30 | 31 | 28 |
| | 32 | 33 | 34 | 35 |
| | 36 | 37 | 38 | 39 |
| | 43 | 40 | 41 | 42 |
| | 47 | 44 | 45 | 46 |
| | 50 | 51 | 48 | 49 |
| | 54 | 55 | 52 | 53 |
| | 57 | 58 | 59 | 56 |
| | 61 | 62 | 63 | 60 |
| | 64 | 65 | 66 | 67 |
| | 68 | 69 | 70 | 71 |
| | 75 | 72 | 73 | 74 |
| | 79 | 76 | 77 | 78 |
| | 82 | 83 | 80 | 81 |
| | 86 | 87 | 84 | 85 |
| | 89 | 90 | 91 | 88 |
| | 93 | 94 | 95 | 92 |
| | 96 | 97 | 98 | 99 |
| | 100 | 101 | 102 | 103 |
| | 107 | 104 | 105 | 106 |
| | 111 | 108 | 109 | 110 |
| | 114 | 115 | 112 | 113 |
| | 118 | 119 | 116 | 117 |
| | 121 | 122 | 123 | 120 |
| | 125 | 126 | 127 | 124 |

| MM# | 0 | 1 | 2 | 3 |
|---|---|---|---|---|
| ADDRESS | 128 | 129 | 130 | 131 |
| | 132 | 133 | 134 | 135 |
| | 139 | 136 | 137 | 138 |
| | 143 | 140 | 141 | 142 |
| | 146 | 147 | 144 | 145 |
| | 150 | 151 | 148 | 149 |
| | 153 | 154 | 155 | 152 |
| | 157 | 158 | 159 | 156 |
| | 160 | 161 | 162 | 163 |
| | 164 | 165 | 166 | 167 |
| | 171 | 168 | 169 | 170 |
| | 175 | 172 | 173 | 174 |
| | 178 | 179 | 176 | 177 |
| | 182 | 183 | 180 | 181 |
| | 185 | 186 | 187 | 184 |
| | 189 | 190 | 191 | 188 |
| | 192 | 193 | 194 | 195 |
| | 196 | 197 | 198 | 199 |
| | 203 | 200 | 201 | 202 |
| | 207 | 204 | 205 | 206 |
| | 210 | 211 | 208 | 209 |
| | 214 | 215 | 212 | 213 |
| | 217 | 218 | 219 | 216 |
| | 221 | 222 | 223 | 220 |
| | 224 | 225 | 226 | 227 |
| | 228 | 229 | 230 | 231 |
| | 235 | 232 | 233 | 234 |
| | 239 | 236 | 237 | 238 |
| | 242 | 243 | 240 | 241 |
| | 246 | 247 | 244 | 245 |
| | 249 | 250 | 251 | 248 |
| | 253 | 254 | 255 | 252 |

FIG. 35 PRIOR ART

| MM# | 0 | 1 | 2 | 3 |
|---|---|---|---|---|
| ADDRESS | 256 | 257 | 258 | 259 |
| | 260 | 261 | 262 | 263 |
| | 267 | 264 | 265 | 266 |
| | 271 | 268 | 264 | 270 |
| | 274 | 275 | 272 | 273 |
| | 278 | 279 | 276 | 277 |
| | 281 | 282 | 283 | 280 |
| | 285 | 286 | 287 | 284 |
| | 288 | 289 | 290 | 291 |
| | 292 | 293 | 294 | 295 |
| | 299 | 296 | 297 | 298 |
| | 303 | 300 | 301 | 302 |
| | 306 | 307 | 304 | 305 |
| | 310 | 311 | 308 | 309 |
| | 313 | 314 | 315 | 312 |
| | 317 | 318 | 319 | 316 |
| | 320 | 321 | 322 | 323 |
| | 324 | 325 | 326 | 327 |
| | 331 | 328 | 329 | 330 |
| | 335 | 332 | 333 | 334 |
| | 338 | 339 | 336 | 337 |
| | 342 | 343 | 340 | 341 |
| | 345 | 346 | 347 | 344 |
| | 349 | 350 | 351 | 348 |
| | 352 | 353 | 354 | 355 |
| | 356 | 357 | 358 | 359 |
| | 363 | 360 | 361 | 362 |
| | 367 | 364 | 365 | 366 |
| | 370 | 371 | 368 | 369 |
| | 374 | 375 | 372 | 373 |
| | 377 | 378 | 379 | 376 |
| | 381 | 382 | 383 | 380 |

| MM# | 0 | 1 | 2 | 3 |
|---|---|---|---|---|
| ADDRESS | 384 | 385 | 386 | 387 |
| | 388 | 389 | 390 | 391 |
| | 395 | 392 | 393 | 394 |
| | 399 | 396 | 397 | 398 |
| | 402 | 403 | 400 | 401 |
| | 406 | 407 | 404 | 405 |
| | 409 | 410 | 411 | 408 |
| | 413 | 414 | 415 | 412 |
| | 416 | 417 | 418 | 419 |
| | 420 | 421 | 422 | 423 |
| | 427 | 424 | 425 | 426 |
| | 431 | 428 | 429 | 430 |
| | 434 | 435 | 432 | 433 |
| | 438 | 439 | 436 | 437 |
| | 441 | 442 | 443 | 440 |
| | 445 | 446 | 447 | 444 |
| | 448 | 449 | 450 | 451 |
| | 452 | 453 | 454 | 455 |
| | 459 | 456 | 457 | 458 |
| | 463 | 460 | 461 | 462 |
| | 466 | 467 | 464 | 465 |
| | 470 | 471 | 468 | 469 |
| | 473 | 474 | 475 | 472 |
| | 477 | 478 | 479 | 476 |
| | 480 | 481 | 482 | 483 |
| | 484 | 485 | 486 | 487 |
| | 491 | 488 | 489 | 490 |
| | 495 | 492 | 493 | 494 |
| | 498 | 499 | 496 | 497 |
| | 502 | 503 | 500 | 501 |
| | 505 | 506 | 507 | 504 |
| | 509 | 510 | 511 | 508 |

FIG.36

| STRIDE | MULTIPLE OF 16 | MULTIPLE OF 16 EXCEPTING MULTIPLE OF 8 | OTHERS |
|---|---|---|---|
| ACCESSING EFFICIENCY | 1/4 | 1/2 | 1 |

FIG.37

| STRIDE | MULTIPLE OF 32 | MULTIPLE OF 16 EXCEPTING MULTIPLE OF 32 | OTHERS |
|---|---|---|---|
| ACCESSING EFFICIENCY | 1/4 | 1/2 | 1 |

FIG. 39

| STRIDE | MULTIPLE OF 16 | MULTIPLE OF 8 EXCEPTING MULTIPLE OF 16 | OTHERS |
|---|---|---|---|
| ACCESSING EFFICIENCY | 1/4 | 1/2 | 1 |

FIG. 41

| RQ# | $RQ_0$ | $RQ_1$ | $RQ_2$ | $RQ_3$ |
|---|---|---|---|---|
| 1 | 0 | 7 | 14 | 21 |
| 2 | 28 | 35 | 42 | 49 |
| 3 | 56 | 63 | 70 | 77 |
| 4 | 84 | 91 | 98 | 105 |
| 5 | 112 | 119 | 126 | 133 |
| 6 | 140 | 147 | 154 | 161 |
| 7 | 168 | 175 | 182 | 189 |
| 8 | 196 | 203 | 210 | 217 |
| 9 | 224 | 231 | 238 | 245 |
| 10 | 252 | 259 | 266 | 273 |
| 11 | 280 | 287 | 294 | 301 |
|  | 308 | 315 | 322 | 329 |

FIG. 40

| STRIDE | 1 | 2 | 3 | 4 | 5 | 6 | 7 | 8 | 9 | 10 | 11 | 12 | 13 | 14 | 15 | 16 | 17 | 18 | 19 |
|---|---|---|---|---|---|---|---|---|---|---|---|---|---|---|---|---|---|---|---|
| ACCESSING EFFICIENCY | 1 | 1 | 2/3 | 1 | 4/5 | 1 | 2/5 | 1 | 2/3 | 1 | 2/3 | 1 | 4/5 | 1 | 7/8 | 1/2 | 1 | 1 | 4/5 |

| 20 | 21 | 22 | 23 | 24 | 25 | 26 | 27 | 28 | 29 | 30 | 31 | 32 |
|---|---|---|---|---|---|---|---|---|---|---|---|---|
| 1 | 2/3 | 1 | 2/3 | 1 | 2/5 | 1 | 4/5 | 1 | 2/3 | 1 | 1 | 1/4 |

FIG. 42

| | | EXECUTION CYCLE → | | | | | | | | | | | | | | | | | | | | | | | |
|---|---|---|---|---|---|---|---|---|---|---|---|---|---|---|---|---|---|---|---|---|---|---|---|---|---|
| | | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 |
| PR₀ | RQ₀ | 0 ⊙ | | | | | | | | | | | | | | | | | | | | 194 224 • | | | ⊙ | |
| | RQ₁ | | | | | | | | | | | | | | | | | 175 203 ⊙ | | | | | ⊙ | | | |
| | RQ₂ | | | | | | | | | | | | | | | | | | 182 210 ⊙ | | | ⊙ | | | | |
| | RQ₃ | | | | | | | | | | | | | | | | | | | | ⊙ | | | ⊙ | | |
| PR₁ | RQ₀ | | | | | | | | | | | 119 147 ⊙ | | | 140 168 • | | | | | | | | | | | |
| | RQ | | | | | | | | | | | ⊙ | 126 154 ⊙ | | | ⊙ | | | | | | | | | | |
| | RQ₂ | | | | | | | | | | | | | 133 161 ⊙ | | | | | | | | | | | | |
| | RQ₃ | | | | | | | | | | | | | | ⊙ | | | | ⊙ | | | | | | | |
| PR₂ | RQ₀ | | | | | | | | | 84 112 ⊙ | • | | | | | | | | | | | | | | | |
| | RQ₁ | | | | | | | 91 • | 98 • | ⊙ | | | | | | | | | | | | | | | | |
| | RQ₂ | | | | | | 63 ⊙ | 70 ⊙ | 77 ⊙ | | | | ⊙ | | | | | | | | | | | | | |
| | RQ₃ | | | | | | | | | 105 • | | | | | | | | | | | | | | | | |
| PR₃ | RQ₀ | | 28 • | | | 56 • | | | | | | | | | | | | | | | | | | | | |
| | RQ₁ | 7 • | 35 • | | | ⊙ | | ⊙ | | | | | | | | | | | | | | | 231 ⊙ | 259 • | | |
| | RQ₂ | 14 • | 42 • | ⊙ | | | ⊙ | | | | | | | | | | | | | | | | | | 238 266 ⊙ • | |
| | RQ₃ | 21 • | | ⊙ | 49 • | | | ⊙ | | | | | | | | | | | | | | | | | | 245 • | 252 ⊙ 273 • |
| PROCESSING REQUEST COUNT | | 1 | 1 | 1 | 1 | 1 | 2 | 2 | 2 | 1 | 1 | 2 | 2 | 2 | 1 | 1 | 2 | 2 | 2 | 1 | 1 | 2 | 2 | 2 | 1 |

VECTOR PROCESSOR WITH A MEMORY ASSIGNED WITH SKEWED ADDRESSES ADAPTED FOR CONCURRENT FETCHING OF A NUMBER OF VECTOR ELEMENTS BELONGING TO THE SAME VECTOR DATA

BACKGROUND OF THE INVENTION

The present invention relates to a vector processor for concurrently processing a plurality of vector elements of vector data, and in particular, to a vector processor adopting a memory skew scheme for preventing deterioration in the accessing performance or efficiency when vector elements are consecutively accessed with a particular address increment value.

In a vector processor, data in the form of an array have been usually stored as vector data in such a method that a sequence of elements of each row of the array are arranged in a continuous memory area. Consequently, when accessing the sequence of elements of an identical row of the array, there are used a string of consecutive addresses. Namely, the addresses thus employed are a sequence of addresses of which the values are increased with an identical increment value (to be called a stride herebelow).

However, as well known, a method of addressing the respective storage locations in a plurality of memory modules constituting a main memory has been attended with a problem of variation in execution speed of accesses to these addresses. For example, an interleaving method has been commonly employed as an ordinary memory addressing method. FIG. 30 shows an example of addresses allocated in a main memory including four memory modules in accordance with the interleaving method. The four memory modules are respectively assigned with numbers 0 to 3 as denoted MM#, namely, MM1 to MM3. In this interleaved addresses, consecutive addresses are sequentially assigned to mutually different memory modules.

However, an address of this example is a number assigned to a memory position to be utilized as an accessing unit. The address definition applies to the following description if not otherwise specified herebelow. Moreover, it is assumed that a memory accessing unit in the vector processor of the prior art and a vector processor in each embodiment according to the present invention is equal to the data length of an element of vector data. Namely, the accessing operation is accomplished for each vector data element.

In the interleaving method in which addresses are sequentially assigned to the different memory modules, when data is accessed with consecutive addresses, the access operation is achieved through the different memory modules in a sequential manner. This leads to a very rapid access to the data. However, it has been known that when accessing equally separated locations based on addresses having an identical stride therebetween, the accessing is possibly concentrated on a particular memory module, which leads to deterioration of the accessing efficiency. FIG. 31 shows relationships between the stride and the memory access efficiency. For example, the problem above occurs when the value of stride is four in the address configuration of FIG. 30. When a sequential access is carried out with the stride set to four in the memory beginning from address "0", the accessing is carried out through the addresses "0", "4", "8", "12", and so on. Each of these addresses are assigned to the memory module MM0 and hence the accessing speed is lowered due to congestion of the accesses.

As means for minimizing the deterioration in the accessing efficiency, there has been known a so-called memory skew scheme. The memory skew scheme has been mathematically based on an article such as D. J. Kuck: "ILLIAC IV Software and Application Programming", IEEE Transactions on Computers, Vol. C-17, No. 8, pp. 758-770, August 1968 or P. Budnik and D. J. Kuck, "Organization and Use of a Parallel Memories", IEEE Transactions on Computers, pp. 1566-1569, December 1971. Moreover, the memory skew scheme is employed in various forms of its variations. Some of Such variations have been described in articles such as D. T. Harper, III and J. R. Jump, "Performance Evaluation of Vector Access in Parallel Memories using a Skewed Storage Scheme", IEEE Transactions on Computers, C-36 (12), pp. 1440-1449, December 1987; D. T. Harper, III and J. R. Jump, "Performance Evaluation of Vector Access in Parallel Memories using a Skewed Storage Scheme", Conf Proc of the 13th Annual International Symposium on Computer Architecture, pp. 324-238, June 1986; and the U.S. Pat. No. 4,918,600. Description will now be given of variation examples of the skew scheme in a system of four vector processors using the skew scheme and four memory modules.

Vector processors employing the skew scheme have been described in the U.S. Pat. Nos. 4,370,732 and 4,918,600. FIG. 32 shows the vector processor disclosed in the U.S. Pat. No. 4,918,600.

The constitution of FIG. 32 includes a processor 500 for sequentially issuing access requests, memory modules 510 to 513, buffers 520 to 523 each for temporarily keeping or storing therein access requests issued from the processor 500, and buffers 530 to 533 for temporarily keeping data respectively read from the memory modules 510 to 513. A reference numeral 540 indicates an address mapping circuit responsive to address information contained in an access request for selecting a memory module to which the access request is to be sent. The processor 500 can send out an access request in each cycle. An access request includes address information so that based thereon, the access request is issued to the destination memory module. In the known example, although four cycles are required to access a memory module, since four modules are sequentially accessed, an access request can be processed in each cycle. Moreover, even in a case where access requests are successively sent to an identical memory module, when a memory module is to be accessed in response to an access request, the other succeeding access requests are provisionally kept in the buffers 520 to 523. Namely, until these buffers are set to the busy state due to the stored data, the succeeding access requests can be issued. In order to return data acquired from the memory modules 510 to 513 to the processor in an order in which the data are previously issued by the processor 500, the buffers 530 to 533 are disposed to temporarily store the data therein.

FIG. 33 shows an addressing applied to memory modules according to a first skew scheme described in the U.S. Pat. No. 4,918,600.

In the skew scheme of FIG. 33, each time the value of access address is incremented by the number of the disposed memory modules (four in this example), the objective memory module is changed for the addressing. Relationships between the memory module number MM#, the address ADR, and the number of memory modules are represented by expression (1) as follows.

$$MM\# = (ADR + ADR \div M) mod 4 \qquad (1)$$

where, mod4 denotes computing a value in modulo 4. In this case, since M takes a value "4" addresses 0, 4, 8, are assigned to the modules, 0, 1, 2, respectively.

Next, FIGS. 34 and 35 show an addressing for memory modules according to the second skew scheme shown in the drawings of the U.S. Pat. No. 4,918,600.

In this skew scheme, each time the address values are increased by the double (=8) of the memory module count, the next memory module is used for the memory assignment. In this situation, relationships between the memory module number MM#, the address ADR, and the number (M) of memory modules are represented by expression (2) as follows.

$$MM\# = (ADR + ADR \div (M \times 2)) mod 4 \qquad (2)$$

For example, addresses 0, 8, and 16 are assigned to the memory modules 0, 1, and 2, respectively.

FIG. 36 shows relationships between the address interval i.e. the stride and the access performance in a case where the first skew scheme represented by expression (1) or shown in FIG. 33 is used in the apparatus of FIG. 32. FIG. 37 shows relationships between the stride and access performance in a case where the second skew scheme represented by expression (2) or shown in FIGS. 34 and 35 is employed. In this case, however, it is assumed that the access performance is attained when the number of access requests to be processed becomes to be substantially fixed when a satisfactorily long period of time is elapsed after the processor 500 starts issuing or sending out an access request. Moreover, the value of access performance is assumed to be represented as one when an element is processed or accessed in each cycle. As can be understood by comparing FIGS. 36 and 37 with FIG. 31, when the first skew scheme of expression (1) or FIG. 33 is adopted, the number of stride types for which the performance is lowered can be minimized. In addition, when the second skew scheme of expression (2) or FIGS. 34 and 35 is utilized, the advantageous tendency is much more increased.

In this connection, the vector processor of the U.S. Pat. No. 4,918,600 is a vector processor which sequentially issues an access request in each cycle. However, to increase the processing efficiency of the vector processor, there has already been employed a vector processor which simultaneously processes a plurality of elements of identical vector data in response to a single instruction. The simultaneous processing above is called a concurrent element processing. The number of elements to be concurrently processed is to be referred to as an element concurrence grade herebelow. A vector processing other than the concurrent element processing is to be called a sequential processing. Next, description will be given of a conventional vector processor accomplishing a concurrent element processing. FIG. 38 shows a vector processor having the element concurrence grade set to four, which has been described in the JP-A-63-66661 filed by the applicant of the present invention.

In this diagram, a reference numeral 14 denotes a vector register unit 15, which includes four vector data controllers 14-0, 14-1, 14-2, and 14-3 and a group of vector registers, not shown.

A reference numeral 15 indicates a requester module for transmitting access requests to a main memory. The requester module 15 includes four request control units 1 to 4 respectively connected to the vector data controllers 14-0 to 14-3.

Reference numerals 9 to 12 designate priority units for deciding priority of access requests for the access processing thereof.

The main memory 13 includes memory modules MM0 to MM3 respectively assigned with numbers "0" to "3". Addresses of these memory modules are allocated such that a continuous memory space is constituted with separate address spaces respectively of the four memory modules.

Subsequently, description will be given of a processing flow to be applied to an access request.

First, access requests are concurrently issued from the request control units 1 to 4 to the request buffer units 5 to 8, respectively. However, if an empty area is missing in the request buffers 5-2 respectively of the request buffer units 5 to 8, any access request is not transmitted or sent out from the request control units 1 to 4.

In the request buffer unit 5, an address decode unit 5-1 decodes an address signal belonging to an access request to determine a number assigned to a memory module to be accessed. The priority unit 9, 10, 11, or 12 corresponding to the memory module is then selected such that the request is notified to a request send-out unit 5-3 of the request buffer unit 5. Moreover, the access request is transferred to the request buffer 5-2 thereof.

When the request buffer 5-2 contains access requests, the request send-out unit 5-3 selects the oldest one of the access requests to transmit the request to one of the priority units 9 to 12 associated with the memory module as the destination of the access request.

The other request send-out units 6-3, 7-3, and 8-3 also conduct the similar processing.

In the priority unit 9, a priority logic or circuit 9-1 determines priority for processing access requests from the respective request buffer units 5 to 8.

The request accept controllers 9-2 accept access requests respectively having the highest priority levels. On accepting an access request, the controller 9-2 sends a request accept signal to the request buffer 5, 6, 7, or 8 from which the access request has been issued.

The other priority logic circuits 10 to 12 also achieve the similar processing.

In the request buffer unit 5, 6, 7, or 8 having received the request accept signal, the request send-out unit 5-3 transmits a subsequent access request to an associated priority unit 9, 10, 11, or 12.

On receiving an access request from either one of the request buffer units 5 to 8, the priority unit 9 sends the access request to the memory module MM0.

The other priority units also carry out the similar processing.

The four vector elements can be thereby processed in a concurrent manner.

In order to improve the access performance of the vector processor, if it is desired to increase the element concurrence grade in the conventional vector processor of FIG. 38, it is necessary to increase the number of request control units (1 to 4 in the example) and that of request buffer units (5 to 8 therein). Resultantly, the number of signal lines connecting these request control units and a memory control unit 20 and those linking the memory control unit 20 with the main memory 13 become to be greater. In this situation, it has been found this accordingly leads to a first problem of difficulty that the overall memory control unit cannot be easily accommodated in a device mounting substrate. To overcome this problem, there has been desired a vector processor which has a higher element concurrence grade and which can be easily mounted on the substrate.

Moreover, as a result of an attempt to implement such a vector processor which has a higher element concurrence grade and which can be easily mounted on the substrate, it has been found that a second problem appears. Namely, when the vector processor conducts memory accesses with various kinds of access strides, the access performance is decreased.

Furthermore, in the vector processor of the prior art shown in FIG. 38, even when the element concurrence grade is low, the performance may possibly be deteriorated depending on the kinds of the employed skew schemes. It has been found that this phenomenon accordingly causes a third problem of limitation of available skew schemes.

These problems have been found by the inventor of the present invention.

SUMMARY OF THE INVENTION

It is therefore an object of the present invention to provide a vector processor of the concurrent element processing type which has a high element concurrence grade and which can be easily arranged on a mounting substrate.

Another object of the present invention is to provide a vector processor of the concurrent element processing type in which deterioration of processing performance is minimized even when various kinds of skew schemes are used.

In order to solve the first problem, there is provided a vector processor according to the present invention comprising N requesters for concurrently issuing access requests for a plurality (N) vector elements, the value N being greater than a value M indicating a number of memory modules respectively belonging to a plurality of concurrent element groups, and storage control units (210, 211) respectively disposed as many as there are requester groups (n in number), the storage control units being disposed for the plural (n) requester groups, the value n being obtained by subdividing the plural requesters, the storage control units being respectively connected to the plural requesters respectively belonging to the requester groups respectively associated therewith and being connected to the plural memory modules, the storage control units receiving a plurality of access requests concurrently supplied from the plural requesters respectively belonging to the requester groups respectively associated therewith and transferring the access requests to the memory modules to which addresses respectively contained in the access requests respectively belong.

Each of the plural memory modules includes memory bank groups (290, 291), the number of the memory bank groups being equal to that (n) of the plural storage control units, and access circuits (280, 281) connected to the plural storage control units and the plural memory bank groups for transferring, in response to the plural access requests concurrently supplied from the plural storage control units, the access requests in a selective manner to the memory bank groups selected from the plural memory bank groups to which addresses respectively contained in the access requests respectively belong.

In order to solve the second problem, there are disposed N requesters (191-198) for concurrently issuing access requests for a plurality (N) vector elements, the value N being greater than the value M indicating the number of memory modules respectively belonging to a plurality of concurrent element groups, and storage control units (210, 211) disposed as many as there are requester groups (n in number), the storage control units being disposed for the plural (n) requester groups, the value n being obtained by subdividing the N requesters, the storage control units being respectively connected to the plural requesters respectively belonging to the requester groups respectively associated therewith and being connected to the plural memory modules, the storage control units receiving a plurality of access requests concurrently supplied from the plural requesters respectively belonging to the requester groups respectively associated therewith and transferring the access requests to the memory modules to which addresses respectively contained in the access requests respectively belong.

Each of the plural request control units belongs to one of the requester control groups determined by a number (a) assigned to an element which is selected from the concurrent element group and for which an access request is issued from the request control circuit.

Furthermore, in order to solve the third problem, there is arranged buffers in a stage preceding the priority unit in association with access request stack units. Moreover, in the request send-out unit of the request buffer unit, there is stored a state of the buffer associated therewith in the preceding stage of the priority unit so as to control the transmission of the access request from the request buffer, thereby allowing the access requests issued from an identical request control unit to be delivered in an arbitrary order or to pass each other.

BRIEF DESCRIPTION OF THE DRAWINGS

These and other objects and advantages of the present invention will become apparent by reference to the following description and accompanying drawings wherein:

FIG. 4 is a schematic diagram showing addresses assigned to the memory modules, bank groups, and memory banks in the vector processor of FIG. 1;

FIG. 5 is a diagram showing an example of addresses of FIG. 4 assigned to the memory modules;

FIG. 6 is a diagram showing another example of addresses of FIG. 4 assigned to the memory modules;

FIG. 7 is a diagram showing an example of the addresses of FIG. 4 assigned to different bank groups in an identical memory module;

FIG. 8 is a diagram showing an example of the addresses of FIG. 4 assigned to different banks in an identical memory module;

FIG. 14 is a diagram useful to explain relationships between the stride and the access request processing performance in a case where the addressing of FIGS. 4 to 6 are applied to the the vector processor of FIG. 1;

FIG. 15 is a diagram showing, in contrast with the addressing of FIGS. 44 to 6, addresses assigned according to another addressing in the the vector processor of FIG. 1;

FIG. 16 is a diagram showing an example of addresses of FIG. 15 assigned to an identical memory bank group;

FIG. 17 is a diagram showing an example of addresses of FIG. 15 assigned to different access-unit areas of an identical memory bank;

FIG. 18 is a diagram showing a group of addresses accessed with the stride set to two and the first address set to one in the embodiment of FIG. 1;

FIG. 19 is a diagram for explaining relationships between the stride and the access request processing performance in a case where the addressing of FIGS. 15 to 17 are applied to the the vector processor of FIG. 1;

FIG. 20 is a diagram showing another element assignment in comparison with the element assignment (FIG. 2) used in the vector processor of FIG. 1;

FIG. 21 is a diagram showing a group of addresses accessed with the stride set to two and the first address set to one in a case where the element assignment of FIG. 20 and the addressing of FIG. 15 are utilized in the embodiment of FIG. 1;

FIG. 22 is a diagram showing relationships between the stride and the access request processing performance in a case where the element assignment of FIG. 20 and the addressing of FIG. 16 are applied to the the vector processor of FIG. 1;

FIG. 23 is a diagram showing a group of addresses accessed from different request control units with the stride set to 15 and the first address set to zero in the vector processor of FIG. 1;

FIG. 29 is a diagram useful to explain relationships between machine cycles and access request processing states in the embodiment of FIG. 28;

FIG. 30 is a diagram showing addresses assigned according to the conventional interleaving method;

FIG. 31 is a diagram for explaining relationships between the stride and the access request processing performance in a case where the addressing is conducted in the interleaving method of FIG. 30 in the conventional vector processor of a sequential processing type of FIG. 32;

FIG. 33 is a diagram showing an example of addresses assigned according to the known first skew scheme;

FIG. 34 is a diagram showing a portion of addresses assigned according to the known second skew scheme;

FIG. 35 is a diagram showing another portion of addresses assigned according to the known second skew scheme;

FIG. 36 is a diagram showing relationships between the stride and the access request processing performance in a case where the addressing is achieved as shown in FIG. 33 according to the first skew scheme in the conventional vector processor of the sequential processing type of FIG. 32;

FIG. 37 is a diagram showing relationships between the stride and the access request processing performance in a case where the addressing is achieved as shown in FIGS. 34 and 35 according to the second skew scheme in the conventional vector processor of the sequential processing type of FIG. 32;

FIG. 39 is a diagram showing relationships between the stride and the access request processing performance in a case where the addressing is achieved as shown in FIG. 33 in the conventional vector processor of the sequential processing type of FIG. 38;

FIG. 40 is a diagram showing relationships between the stride and the access request processing performance in a case where the second skew scheme of FIGS. 34 and 35 are employed in the conventional vector processor of a sequential processing type of FIG. 38;

FIG. 41 is a diagram showing addresses to be accessed through different machine cycles with an access request issued with the stride set to seven in the conventional vector processor of the sequential processing type of FIG. 38; and FIG. 4 is a diagram useful to explain processing states of access requests in the conventional vector processor of a sequential processing type of FIG. 38.

DESCRIPTION OF THE PREFERRED EMBODIMENTS

Prior to detailed explanation of embodiments according to the present invention, description will be given in detail of the problems of the prior art.

As already described above, when the element concurrence grade is increased, there also appears an increase in the number of signal lines of the storage control unit to send outputs therefrom. This consequently leads to the first problem that the entire storage control unit cannot be installed on a mounting substrate.

Figure 38:
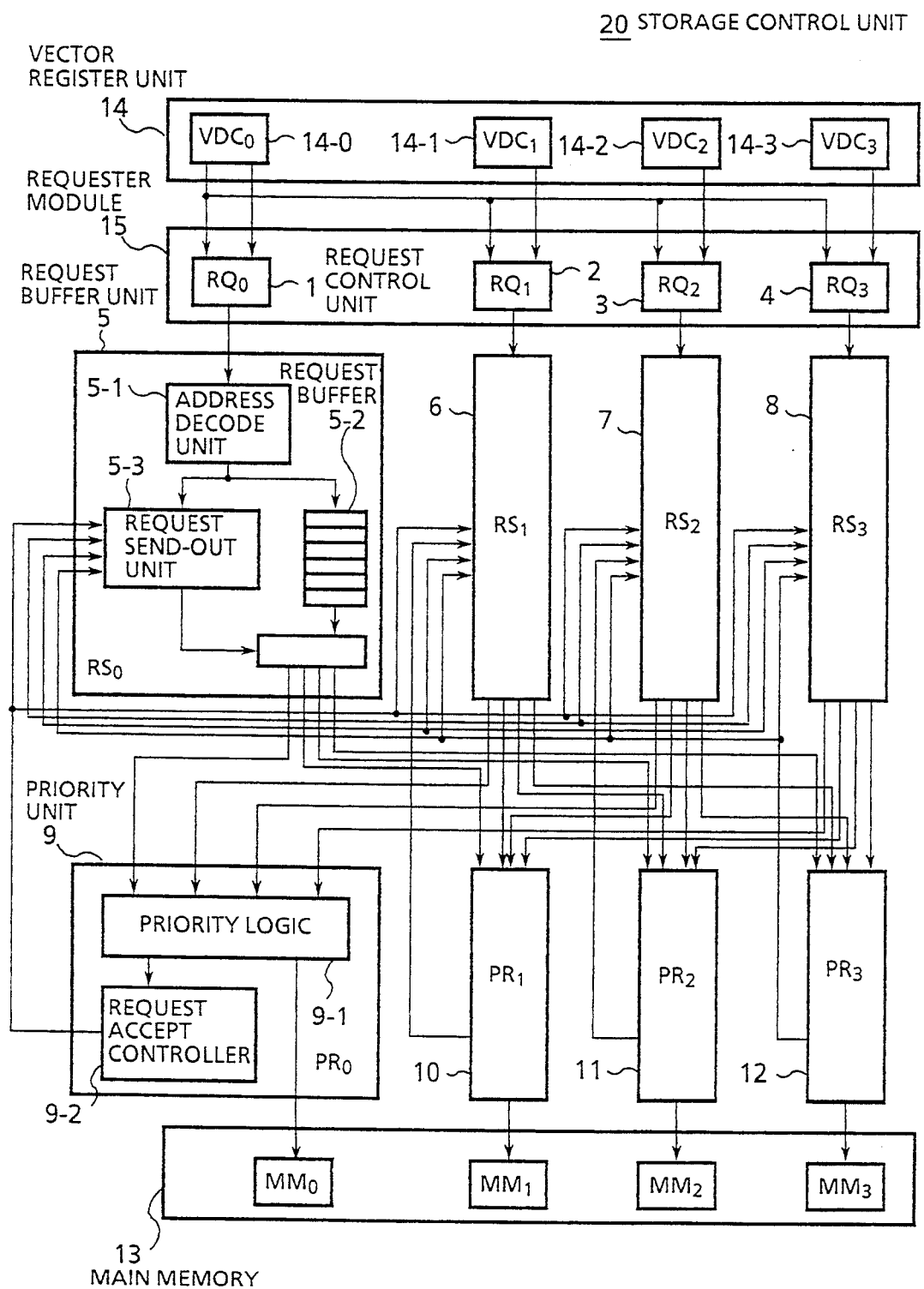
FIG. 38 is a block diagram schematically showing a conventional vector processor of a concurrent element processing type.

Moreover, in order to solve the problem, it may be considered to subdivide each storage control unit into a plurality of partitions so as to minimize the number of signal lines to be extended therefrom. However, it has been found this subdivision causes another problem. That is, as shown in FIG. 38, when a plurality of vector data control units are sequentially assigned to a plurality of request control units to apply the skew scheme to memory modules, access requests from the respective requester modules are possibly concentrated on a particular memory module. This causes a congestion of signals at an exit from the requester modules to the memory module, which leads to the second problem that the performance deterioration take place with an increased number of stride kinds. The second problem will be described later in conjunction with an embodiment of the present invention.

Moreover, as described above, it has been found that the conventional vector processor of the concurrent element processing type is attended with the third problem. Namely, depending on a skew scheme employed, the access performance is decreased even with a low value of element concurrence grade. Description will now be given in detail of the third problem.

Figure 25:
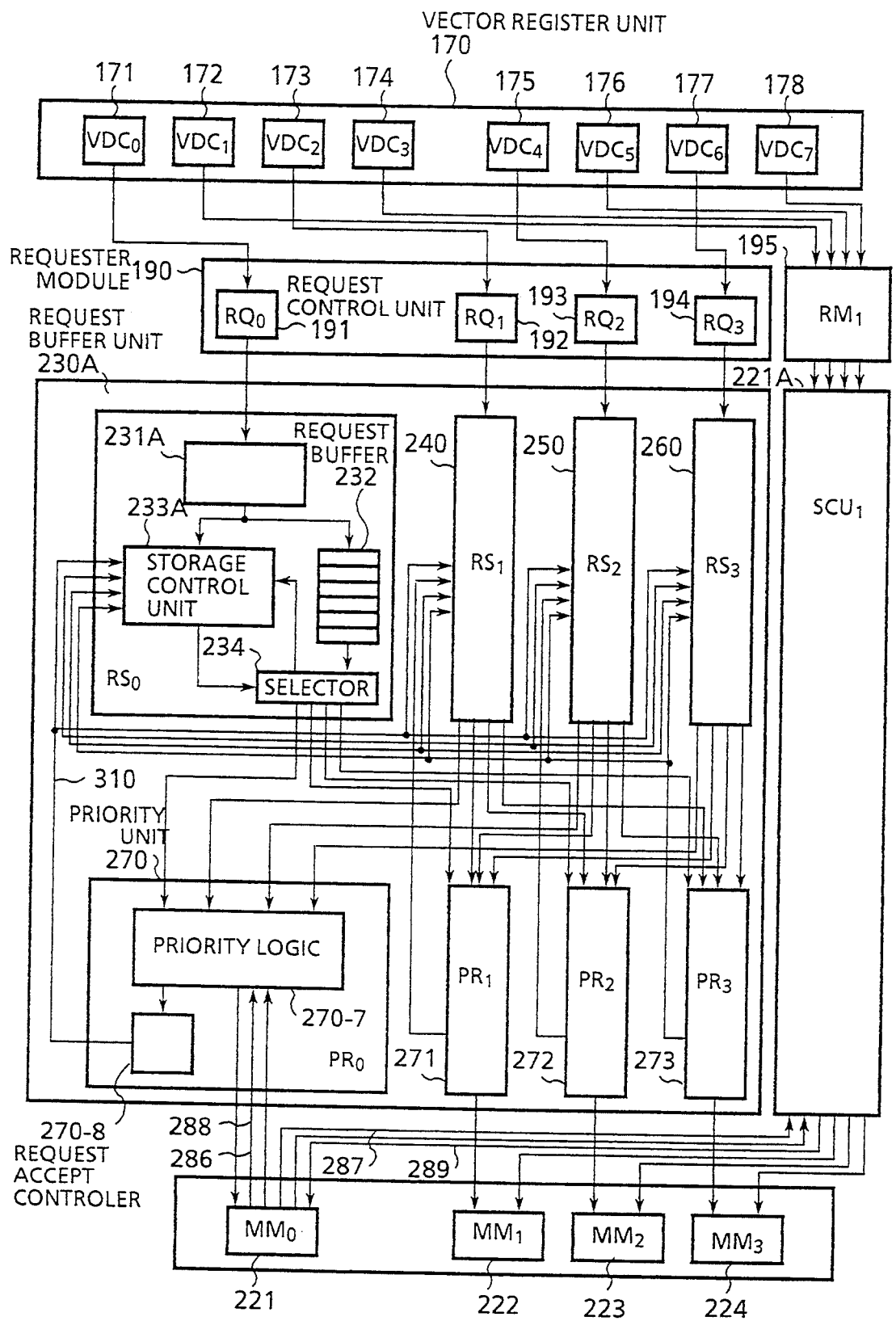
FIG. 25 is a schematic diagram showing the constitution of a vector processor in a second embodiment according to the present invention.

In the conventional vector processor described in the JP-A-63-66661, there has been used a skew scheme substantially equivalent to the first skew scheme represented by expression (1) or shown in FIG. 33. Analyzing relationships between the stride and the access performance developed when the first scheme is used in the processor, the results are represented as FIG. 39. In this connection, without using the skew scheme, when the interleaving method is employed to assign addresses, there are obtained an access performance identical to that shown in FIG. 31. When the second skew scheme represented by expression (2) or shown in FIGS. 34 and 25 is used, there have been attained relationships as shown in FIG. 40 by analyzing the results. These relationships have been found by the inventor of the present invention through the analyses.

As can be appreciated by comparing FIG. 39 with FIG. 40, there exists a problem. Namely, when the second skew scheme represented by expression (2) or shown in FIGS. 34 and 35 is adopted in the vector processor of the concurrent element processing type of FIG. 38, the performance is increased with the stride "8" and is decreased with the stride set to "3", "5", "7", or "9" as compared with the case where the first skew scheme of expression (1) or FIG. 33 is utilized.

This is because that while an access request is being processed in the request buffer unit 5 by the priority unit 9 to decide the processing priority, the exits of the request buffer unit 5 to 8 are congested with access requests. Consequently, when the access request is assigned with a lower priority level as a result of priority decision and hence is set to a wait state, the access requests succeeding the access request set to the wait state cannot be employed in the priority decision to be achieved by another priority unit 9.

Description will now be given of an example the phenomenon with the stride set to seven.

FIG. 41 shows addresses to be accessed by access requests respectively issued from the request control units 1 (RQ0), 2 (RQ1), 3 (RQ2), and 4 (RQ3) in the respective machine cycles when the access stride is seven.

In the first machine cycle, addresses "0", "7", "14" and "21" are respectively assigned, as shown in FIG. 34, to the memory modules MM0, MM3, MM3, and MM3. Consequently, the access requests to these addresses are to be sent to the priority units 9, 12, 12, and 12, respectively.

Access requests respectively to the addresses "0" and "7" respectively necessitates accesses to the different memory modules MM0 and MM3 and hence are immediately accepted by the priority units 9 and 12, respectively. However, the access requests to the addresses "14" and "21" necessitate accesses to the memory module MM3 like the access request to the address 7" and hence are not accepted like in the case above. Namely, these requests are held in the request buffers 5-2 of the request buffer units 7 and 8, respectively.

In the subsequent machine cycle, access requests to addresses "28", "35", "42", and "49" are transmitted from the request control units 1 to 4, respectively. These addresses each belong to the memory module MM3. Since the access requests to the addresses "28" and "35" are associated with the memory module MM3 and hence are transmitted to the priority unit 12 after the processing is finished at the addresses "14" and "21". However, since the preceding access requests to the addresses "14" and "21" are beforehand held in the request buffers 5-2 respectively of the request buffer units 7 and 8, the access requests are attached to the request queue following the access requests held in the buffers 5-2. Namely, the access requests to the addresses "42" and "49" are kept held therein until the preceding access requests to the addresses "14" and "21" are sent therefrom to the priority unit 12.

In the next cycle, the access requests to addresses "56", "63", "70", and "77" are issued from the request control units 1 to 4, respectively. These addresses respectively belong to the memory modules MM3, MM2, MM2, and MM2. Although the address "63" is associated with the memory module MM2, the access request thereto cannot be processed in the request buffer 5-2 of the request buffer unit 6 having received the access request while the preceding access request to the address "35" related to the memory module MM3 is kept remained in the wait state.

As above, the access requests are thus accumulated in the related request buffer units 5 to 8, which finally causes a situation where any one of the request control units 1 to 4 cannot issue an access request.

FIG. 42 shows the processing states in association with the respective machine cycles.

In this diagram, PR0, PR1, PR2 and PR3 respectively stands for priority units 9 to 12; whereas, RQ0, RQ1, RQ2, and RQ3 respectively designate request control units 1 to 4. A dot '.' indicates timing when an access request is sent to the priority unit 9, 10, 11, or 12; whereas, a circle denotes timing when an access request is delivered to the memory module MM0, MM1, MM2, or MM3. When a dot is linked with a circle in this diagram, it is assumed that the associated access request is waiting for selection by the priority unit 9, 10, 11, or 12. The processing request count in the bottom row represents the number of access requests processed in each machine cycle.

In this regard, at least one access request can be processed in a machine cycle. This is at most half the maximum performance value i.e. four access requests in a cycle.

Next, description will be given of embodiments of vector processors which solve one of or some of the problems above.

Embodiment 1

Figure 1:
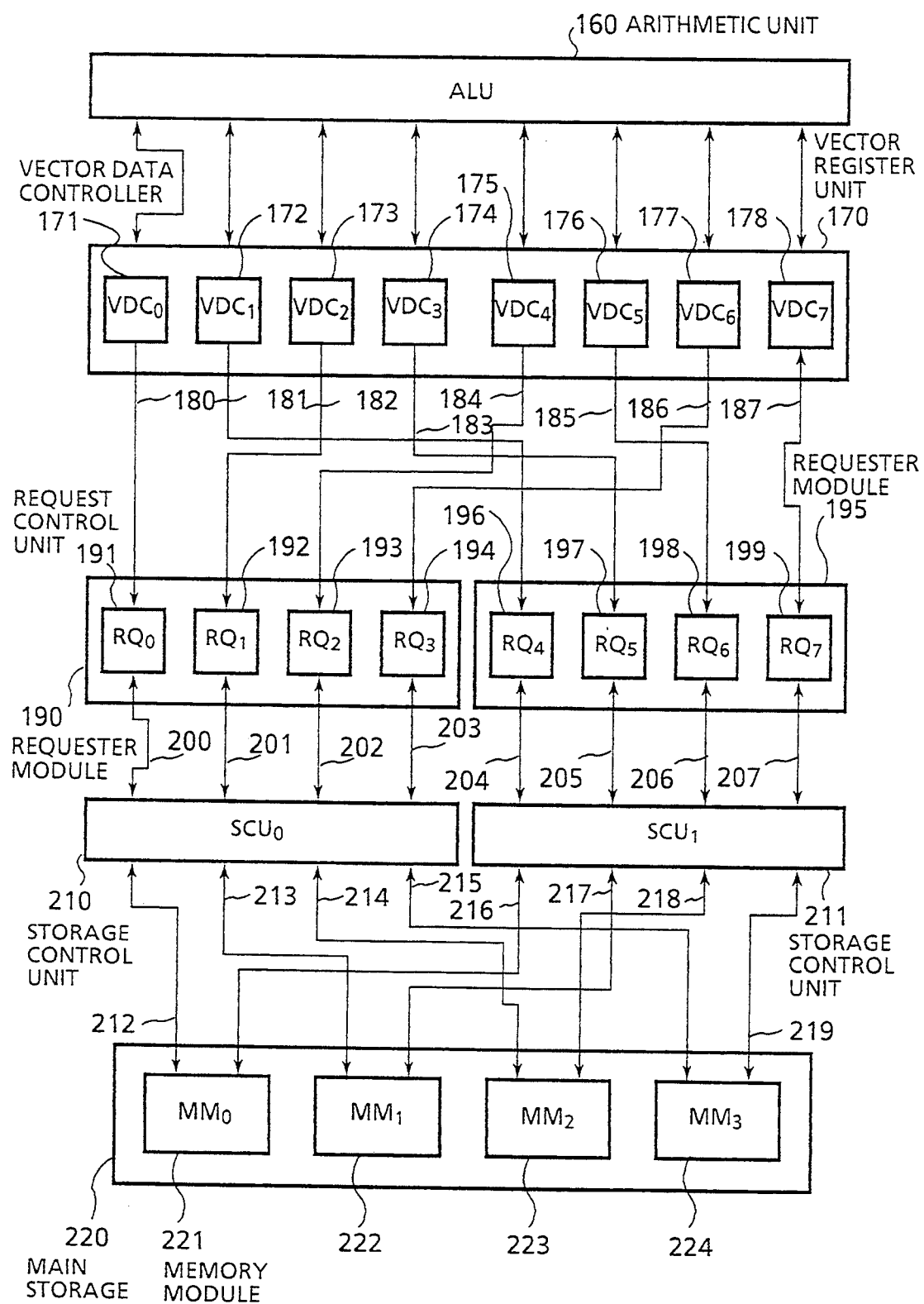
FIG. 1 is a schematic diagram showing the primary portion of a vector processor of the concurrent element type in a first embodiment according to the present invention.

FIG. 1 shows the primary constitution of the vector processor in a first embodiment according to the present invention. In the processor of this embodiment, eight elements of vector data are concurrently processed.

The vector processor includes an arithmetic logic unit (ALU) or an arithmetic logic 160 in short, a vector register unit (VRU) 170 constituted with a plurality of vector registers (not shown), two requester modules (RMs) RM0 190 and RM1 195, two storage control units (SCUs) SCU0 210 and SCU1 211, and a main storage (MS) 220. The requester modules 190 and 195 include four request control units 191 to 194 and 196 to 199, respectively. The main storage unit 220 includes four memory modules MM0 to MM3.

In the vector processor of this embodiment, there can be processed instructions such as a load instruction for storing vector data from the main storage 220 into a vector register, a store instruction for storing vector data from a vector register into the main storage 220, and an arithmetic operation for reading vector data from a vector register to achieve an arithmetic operation thereon in the arithmetic unit 160 and for storing resultant vector data in another vector register. However, for simplification of explanation of the present invention, the system constitutions shown and described herein are primarily related to the store instruction. Namely, the remaining circuit structure for the other instructions is omitted for easier understanding of the present invention.

The vector data to be stored are supplied from the vector register unit 170 in the form of a plurality of groups each being constituted with eight vector data elements. These groups are herebelow called concurrent element groups. The vector elements of an identical concurrent element group are supplied in a parallel or concurrent fashion from the vector register unit 170.

The vector register unit 170 has eight vector data controllers VDC0 171 to VDC7 178.

These controllers 171 to 178 are responsive to an identical store instruction to issue an access request to the main storage 220 for storing therein vector data specified by the store instruction. The access requests are fed via paths 180 to 187 to the requester modules 190 and 195. In response to the store instruction, the vector register unit 170 including a plurality of vector registers not shown reads vector data to be stored in the main storage 220 from the vector registers associated with the instruction. Eight elements of vector data are thus attained at a time. The configurations related to the vector register read and write operations have been commonly known and hence are not shown for simplification of the drawings.

In this embodiment, the storage control unit section is subdivided into two storage control units 210 and 211 each responsive to the store instruction. Each of these storage control units is connected to four memory modules. The requester module section is constituted with two requester modules RM0 190 and RM1 195. The requester module RM0 190 includes four request control units RQ0 191 to RQ7 194 respectively connected to the vector data controllers 171, 173, 175 and 177. The other requester module RM1 191 includes four request control units 196 to 199 respectively connected to the vector data controllers 172, 174, 176, and 178.

In this embodiment, the request control units 191 to 194 are connected to the storage control unit 210, whereas the other request control units 196 to 199 are connected to the storage control unit 211. These request control units send access requests received from the vector data controller 170 via the paths 200 to 207 associated therewith to the storage control unit 210 or 211. The storage control unit 210 receives four access requests from the request module 190 to transfer the access requests to the memory modules to which addresses respectively designated by the access requests belong. This substantially applies to the storage control unit 211.

As above, the system are configured with two storage control units of the storage control unit section and two requester modules of the requester module section, thereby minimizing the number of signal lines connected to the storage control units and the requester modules. As a result, the two storage control units and the two request modules are arranged on mutually different mounting substrates.

Figures 2, 3:
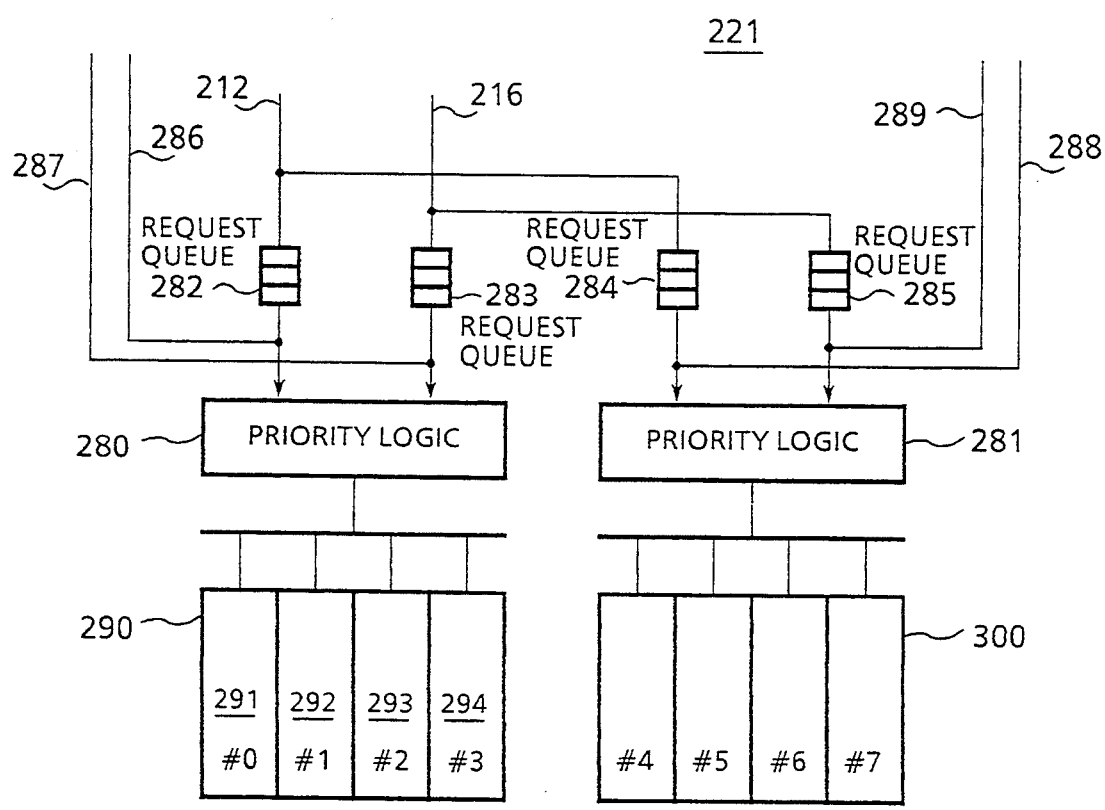
FIG. 2 is a diagram for explaining an element assignment in the vector processor of FIG. 1.
FIG. 3 is a block diagram showing a memory module used in the vector processor of FIG. 1.

FIG. 2 shows correspondences between the vector data controllers VDC0 to VDC7 and the request control units RQ0 to RQ7 (i.e. assignment of elements to the request control units). In the element or component assignment method of FIG. 2, each vector data controller having a number assigned thereto is assigned to a requester module having a number assigned thereto which is equal to a remainder obtained by dividing the number assigned to the vector data controller by the number (two) of requester modules. According to the assignment method, among the eight access requests to be processed at a time, those issued with an even serial number are delivered from the request control unit of the requester module RM0, whereas those issued with an odd serial number are sent from the request control unit of the requester module RM1. Consequently, the memory modules are uniformly accessed from the two request modules, namely, the access requests from the respective requester modules are not concentrated onto any particular memory module, thereby improving the access performance. The access performance improvement will be described later in detail.

FIG. 3 is a detailed block diagram of the memory module MM0, which is constituted with two priority logics 280 and two bank groups 290 and 300. At an entry of the priority logic 280 for priority within bank groups, there are disposed request queues 282 and 283 respectively associated with signal lines 212 and 216. Similarly, at an entry of the priority logic 281 for priority within bank groups, request queues 284 and 285 are arranged respectively in association with the signal lines 212 and 216. In this regard, signal lines 286 to 289 are disposed to notify whether or not the request queues 282 to 285 are full of request data to the priority logic 270-7 in request control unit 270, 271, 272, or 273. The bank group 290 includes four memory banks 291 to 294. Each bank group, for example, the bank group 290 can be concurrently accessed from different signal lines, for example, signal lines 212 and 216 from the storage control units 210 and 211 for the memory modules to which the bank group belongs. This is also the case of the bank group 300. The configuration substantially applies to the memory modules MM1 to MM3.

As above, the main storage 220 is constructed in three hierarchic levels, namely, memory modules, bank groups, and banks.

In this embodiment, each memory module includes therein two bank groups, which are connected via the respective signal lines to the two storage control units 210 and 211. With this provision, each of the memory modules can be concurrently accessed from the requester modules 190 and 191. As a result, the number of concurrent element groups to be concurrently processed becomes to be greater than that of the memory modules.

FIG. 4 shows an addressing example in the memory modules, the bank groups, and the banks at the respective hierarchic levels. The addressing produces a hierarchic skewed memory in which the skew scheme is applied to each of the hierarchic levels.

In association with the addressing of FIG. 4, an addressing to different memory modules, an addressing of different bank groups of the memory module 0, and an addressing of different banks of the bank group 0 are shown in FIGS. 5 and 6, FIG. 7, and FIG. 8 respectively. As can be seen therefrom, at the hierarchic levels of memory modules and bank groups and at the hierarchic level of banks, there are respectively employed a skew scheme in which the address is skewed each time 16 elements are processed and a skew scheme in which the address is skewed each time eight elements are processed.

This embodiment is characterized as follows. Namely, the storage control unit section is constituted with two storage control units 210 and 211, and the requester module section includes two requester modules 190 and 195 and the vector data controllers 171, 173, 175, and 177 each assigned with an odd serial number and the vector data controllers 172, 174, 176, and 178 each assigned with an even serial number, which are allocated to the requester modules 190 and 195, respectively. Moreover, each memory module includes bank groups disposed as many as there are storage control units so that the bank groups disposed in the respective memory modules are concurrently accessed from the different storage control units. Furthermore, in each memory module, there are employed a skew scheme for the memory modules and the bank groups in which the address is skewed each time 16 elements are processed and a skew scheme for the banks in which the address is skewed each eight 16 elements are processed. The priority unit 270 in each of the storage control units 210 and 211 includes a request hold unit 270-1 (FIG. 11), which will be described later. Moreover, a request sendout unit 233 disposed in the request buffer includes request queue control units 321 to 324 (FIG. 13), which will be described later. In addition, at an entry of each of the priority logics 280 and 281 of the memory modules 221 to 224, there are disposed the request queues 282 to 285 (FIG. 3) respectively related to request control units 270 to 273.

Subsequently, description will be given of the addressing shown in FIG. 4. As above, the addresses are assigned to the memory modules, the bank groups, and the banks at the respective hierarchic levels according to the associated skew schemes.

In the addressing to the memory modules, there is employed in the embodiment a skew scheme developed by modifying the skew scheme represented by expression (2). That is, in place of the memory module count N of the skew scheme represented by expression (2), the bank group count is adopted as shown in the following expression (3).

$$MM\# = (ADD + ADR \div (bank\ group\ count \times 2)) mod 4 \qquad (3)$$

In this embodiment, since the bank group count is eight, a value "16" attained by multiplying the bank group count by two is used for the address skewing operation. Namely, there is adopted a skew scheme in which the address is skewed for every 16th element. As compared with the cases where the interleaving method and the first skew scheme represented by expression (1) are respectively utilized, the chance of concentration of access requests onto a particular memory module is minimized in the embodiment above.

Moreover, in the addressing of the other hierarchic levels (bank groups and banks), there are adopted skew schemes in which the address is skewed for every 16th element in the bank groups and for every eighth element in the banks. With the provision of the address skew, for a stride for which the access request concentration does not occur in a particular bank group, such an access request concentration does not take place also in any particular bank group and any particular bank.

The addressing above have been determined according to the following idea. That is, in a case of the skew scheme in which the value attained by multiplying the bank group count by two is used for the address skew e.g. in the case of the embodiment where the address is skewed for every 16th element, the maximum performance is developed with a stride determined by the following expression (4).

$$Stride\ for\ maximum\ performance = Bank\ group\ count \times 2 \div Storage\ control\ unit\ count \qquad (4)$$

In this embodiment, since the storage control unit count is two, the stride developing the maximum performance accordingly becomes to be eight.

In relation thereto, the addressing to the bank groups and the banks are determined so that the maximum performance is developed with the stride set to eight. Namely, in this case, the address is incremented by 64 for every concurrent element groups (constituted with eight elements in this embodiment). In order to obtain the maximum performance with the stride value set to eight, the bank group or the bank as an object of the addressing is skewed for each concurrent element group.

In consequence, the bank group is skewed in each memory module and hence the skew operation need only be accomplished for each element count represented by the following expression (5). In this expression, values enclosed with parentheses apply to the embodiment. The element count is set to 16 in this embodiment.

For a bank group:

$$Element\ count\ for\ address\ skew = Stride\ for\ maximum\ performance\ (8) \times Bank\ group\ count\ (8) \div Memory\ module\ count\ (4) \qquad (5)$$

Similarly, the bank group is skewed for each memory module. Consequently, the bank group need only be skewed for each element count represented by the following expression (6). In this expression, values enclosed with parentheses apply to the embodiment. The element count is eight in this embodiment.

For a bank:

$$\text{Element count for address skew} = \text{Stride for maximum performance (8)} \times \text{Bank group count (8)} \div \text{bank group count (8)} \quad (6)$$

As a result, according to expression (6), the element count for the address skew for the bank becomes to be identical to the value of stride for the maximum performance.

However, even when this addressing is adopted, access requests may possibly be concentrated onto a particular bank or bank group in some case. Description will next be given of such a case of request congestion and the access performance in the situation.

First, description will be given of the access concentration onto a particular bank group.

When all access requests are concentrated onto a particular bank group, only one access request can be processed in a cycle. Consequently, the access performance is developed as follows since the number of access requests to be processed at the maximum performance is eight.

$$1 \div 8 = \tfrac{1}{8}$$

When all access requests are concentrated onto two particular bank groups, only two access requests can be processed in a cycle. The access performance is consequently developed as follows.

$$2 \div 8 = \tfrac{1}{4}$$

When all access requests are concentrated onto four particular bank groups, only four access requests can be processed in a cycle. The access performance is consequently developed as follows.

$$4 \div 8 = \tfrac{1}{2}$$

Next, description will be given of the access concentration onto a particular bank.

When all access requests are concentrated onto two particular bank, only one access request can be processed in four cycles. The access performance is consequently developed as follows since the number of access requests to be processed at the maximum performance is eight.

$$1 \div 8 \div 4 = 1/32$$

When all access requests are concentrated onto two particular banks, only two access requests can be processed in four cycles. The access performance is consequently developed as follows.

$$2 \div 8 \div 4 = 1/16$$

When all access requests are concentrated onto four particular banks, only four access requests can be processed in four cycles. The access performance is consequently developed as follows.

$$4 \div 8 \div 4 = \tfrac{1}{8}$$

When all access requests are concentrated onto eight particular banks, only eight access requests can be processed in four cycles. The access performance is consequently developed as follows.

$$8 \div 8 \div 4 = \tfrac{1}{4}$$

When all access requests are concentrated onto 16 particular banks, only 16 access requests can be processed in four cycles. The access performance is consequently developed as follows.

$$16 \div 8 \div 4 = \tfrac{1}{2}$$

Subsequently, description will be given of the circuit configuration of the embodiment and its operation in conjunction with processing of an access request required by a store instruction.

First, information of a vector store instruction i.e. an address of a first element of vector data represented by a base address and a stride is concurrently delivered as an initial value from each of the vector data controllers VDC0 171 to VDC7 178 of the vector register unit 170 to the respectively associated request control units 191 to 194 and 196 to 199 of the respective requester modules 190 and 195. Moreover, a set of signals including a memory access request REQ, a signal ST denoting that the request is a store request, and store data is concurrently sent from each of the vector data controllers VDC0 171 to VDC7 178 to the request control units 191 to 194 and 196 to 199 associated therewith.

Of the request control units 191 to 194 and 196 to 199 respectively assigned with numbers 0 to 7, an i-th request control unit generates an address for a storing operation of an i-th vector element of each concurrent element group supplied from the vector register unit 170 and then delivers the address together with the i-th vector element to the storage control unit 210 or 211. The address ADDji of the i-th vector element fed from the vector register unit 17 is represented by the following expression (7).

$$ADDji = \text{Base address} + (j \cdot N + i) \cdot S \cdot L \quad (7)$$

where, N is an element concurrence grade, S stands for a stride, and L designates a data length of each element. In this embodiment, the values of N and L are both assumed to be eight.

Figure 9:
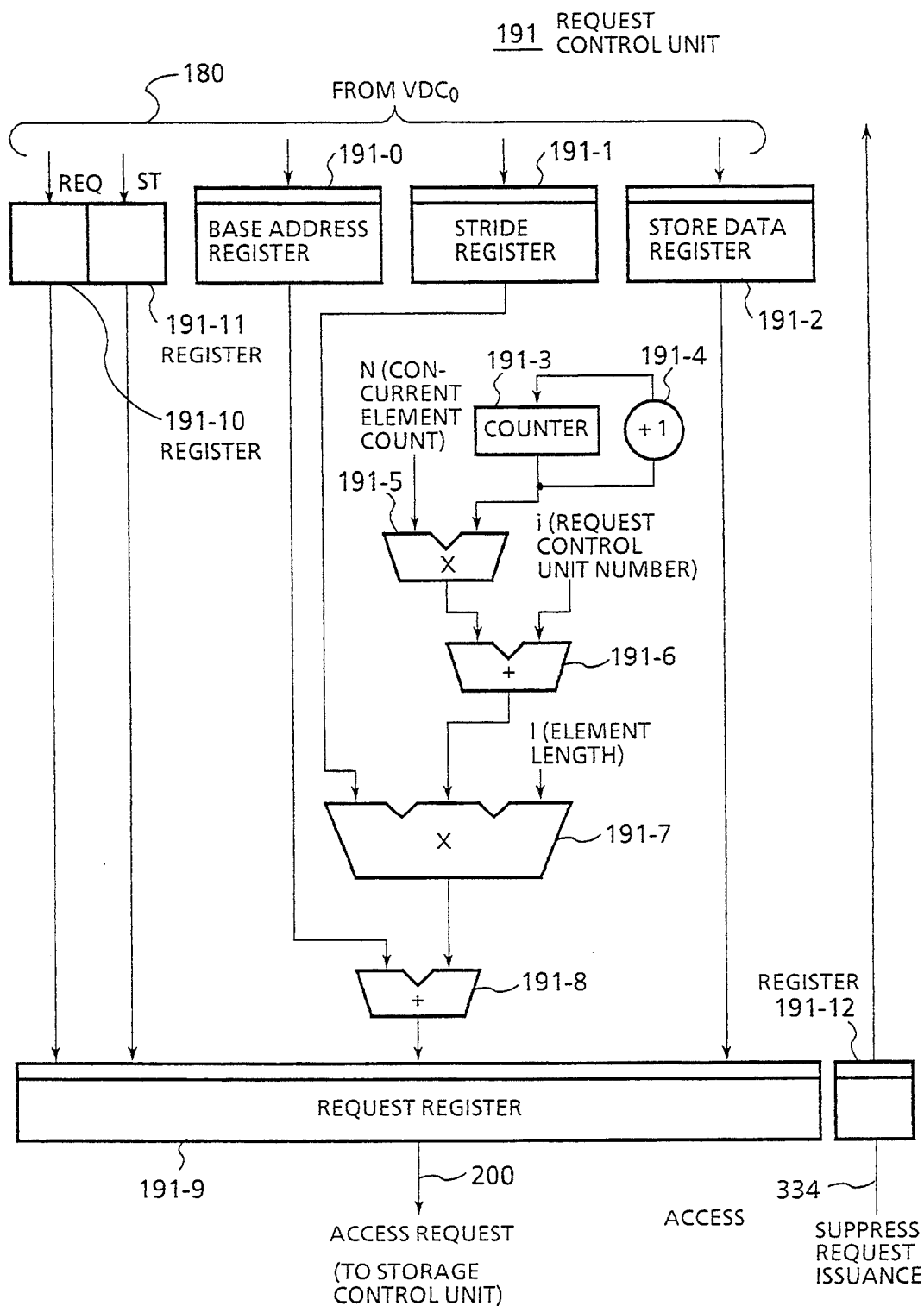
FIG. 9 is a block diagram showing a request control unit used in the vector processor of FIG. 1.

FIG. 9 shows the request control unit 191 in a detailed block diagram. The request control unit 191 includes registers 191-1, 191-2, 191-3, 191-10, and 191-11 for respectively keeping a base address, a stride, store data, a signal REQ, and a signal ST; a vector element counter 191-4, an incrementer 191-5, multipliers 91-6 and 191-7, adders 191-8 and 191-9, and request register 191-10. The other request control units 192 to 194 are also configured in substantially the same structure.

Description will now be given of the operations of the request control units 191 to 194 and 196 to 199. The operation of the request control unit 191 will be representatively explained.

In the request control unit 191 of FIG. 9, the base address and the access stride are respectively kept in the base address register 191-0 and the stride register 191-1. Moreover, each time a set of signals including the store data (the 0th element of each concurrent element group of vector data to be stored), the access request signal REQ, and the store request signal ST is received, these items are set to the registers 191-2, 191-10, and 191-11, respectively. In the i-th request control unit, according to expression (7), the address ADDji of the the i-th element of the j-th concurrent element group is computed as follows. The counter 191-3 is disposed to count the access requests issued from the request control unit 191. The initial value thereof is zero. The content of the counter 191-3 is incremented by one by the incrementer 191-4 each time an access request REQ is issued. Consequently, the content prior to an update stands for a number j of the concurrent element group to which the just received store data belongs. In consequence, according to expression (7), the objective address ADDji is computed by the multipliers 191-5 and 191-7 and the adders 191-6 and 191-8. The address ADDji, the store data kept in the store data register 191-2, and the the signals REQ and ST kept in the registers 191-10 and 191-11 are transferred to the request register 191-9 to be combined with each other therein, thereby producing an access request to be fed to the storage control unit 210 or 211.

In this regard, each request control unit are so constituted such that when a request send-out suppress signal 334, which will be described later, is received from the storage control unit 210 or 211, the request control unit sends the signal 334 to the vector data controller 171 to suppress the subsequent access request transfer. However, the configuration of the circuit suppressing the transfer is not disclosed for simplicity in this embodiment.

Figure 10:
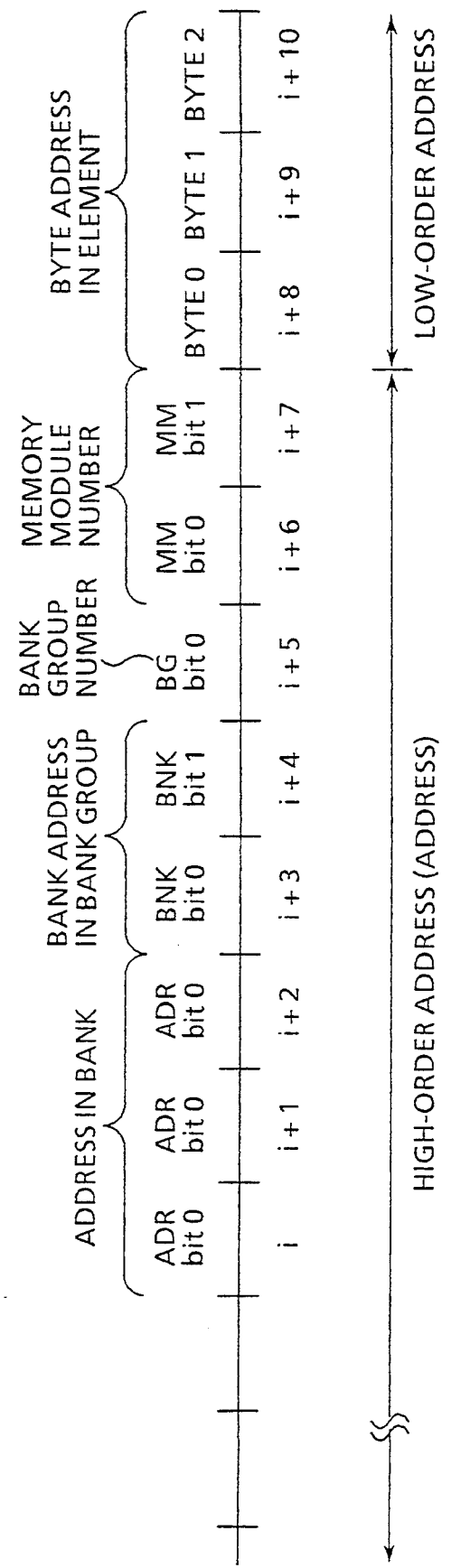
FIG. 10 is a diagram showing the contents of an address signal supplied to a storage control unit of FIG. 11.

FIG. 10 shows a plurality of fields of address data created by the request control unit 191 to 194 and 196 to 199. In this diagram, the high-order address is the address previously defined, namely, the number assigned to the main storage according to each access unit. In this embodiment, the high-order address is simply called an address in some cases. Furthermore, the low-order address is a byte address in an element of vector data. In this embodiment, since a vector element is constituted with eight bytes, the low-order address includes three bits. Next, description will be given of the contents of the address bits with an origin set to the i-th bit relative to the higher-most bit. First, three bits ranging from (i+8)-th bit to (i+10)-th bits, namely, BYTE0, BYTE1, and BYTE2 indicate a byte address in a vector element as above. Two bits including (i+6)-th bit and (i+7)-th bit i.e. MMbit0 and MMbit1 designate a memory module to which an address is assigned in a case where the addressing is conducted to the memory modules 21 to 224 in the interleaving method. An (i+5)-th bit i.e. BGbit indicates a bank group to which the address is assigned in the memory module. Two bits including (i+3)-th bit and (i+4)-th bit, namely, BNKbit0 and BNKbit1 stand for a bank number to which the address is assigned in the bank group. Three bits including i-th bit, (i+1)-th bit, and (i+2)-th bits i.e. ADRbit0, ADRbit1, and ADRbit2 represent a number assigned to the address, the number denoting a storage position allocated in the bank according to the access unit.

Figure 11:
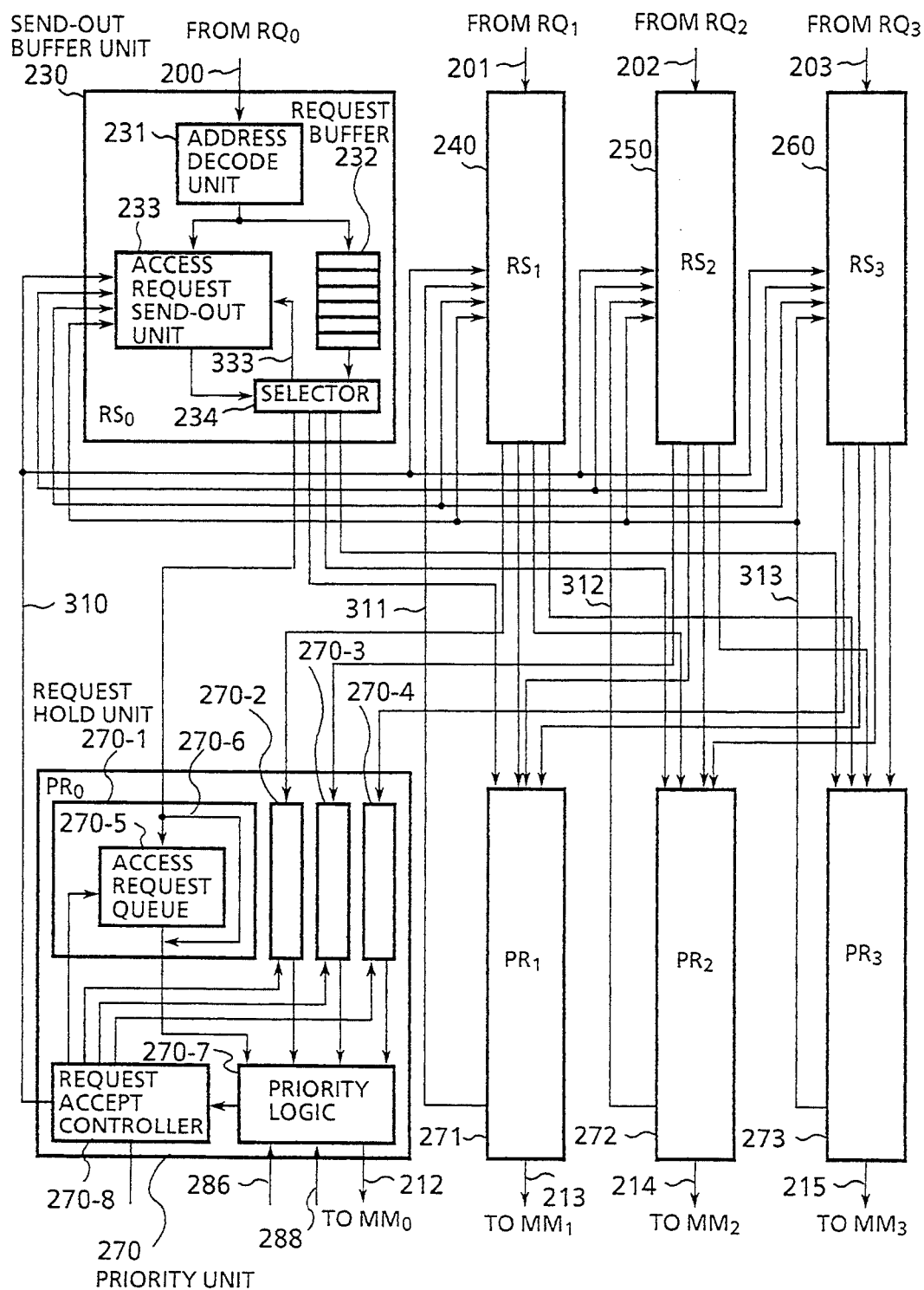
FIG. 11 is a diagram showing the construction of a storage control unit utilized in the vector processor of FIG. 1.

The storage control unit 210 includes, as shown in FIG. 11, four request buffer units 230, 240, 250,.and 260 and four priority circuits 270 to 273. The storage control unit 211 has also substantially the same construction.

The request buffer units 230 includes an address decode unit 231, a request buffer 232, and a request send-out unit 233.

In the address decode unit 231 of the request buffer unit 230, an address contained in an access request is converted according to the skew scheme of the embodiment into an address including a memory module number, a bank group number, a bank number, and an intra-bank address denoting an address in a bank.

Figure 12:
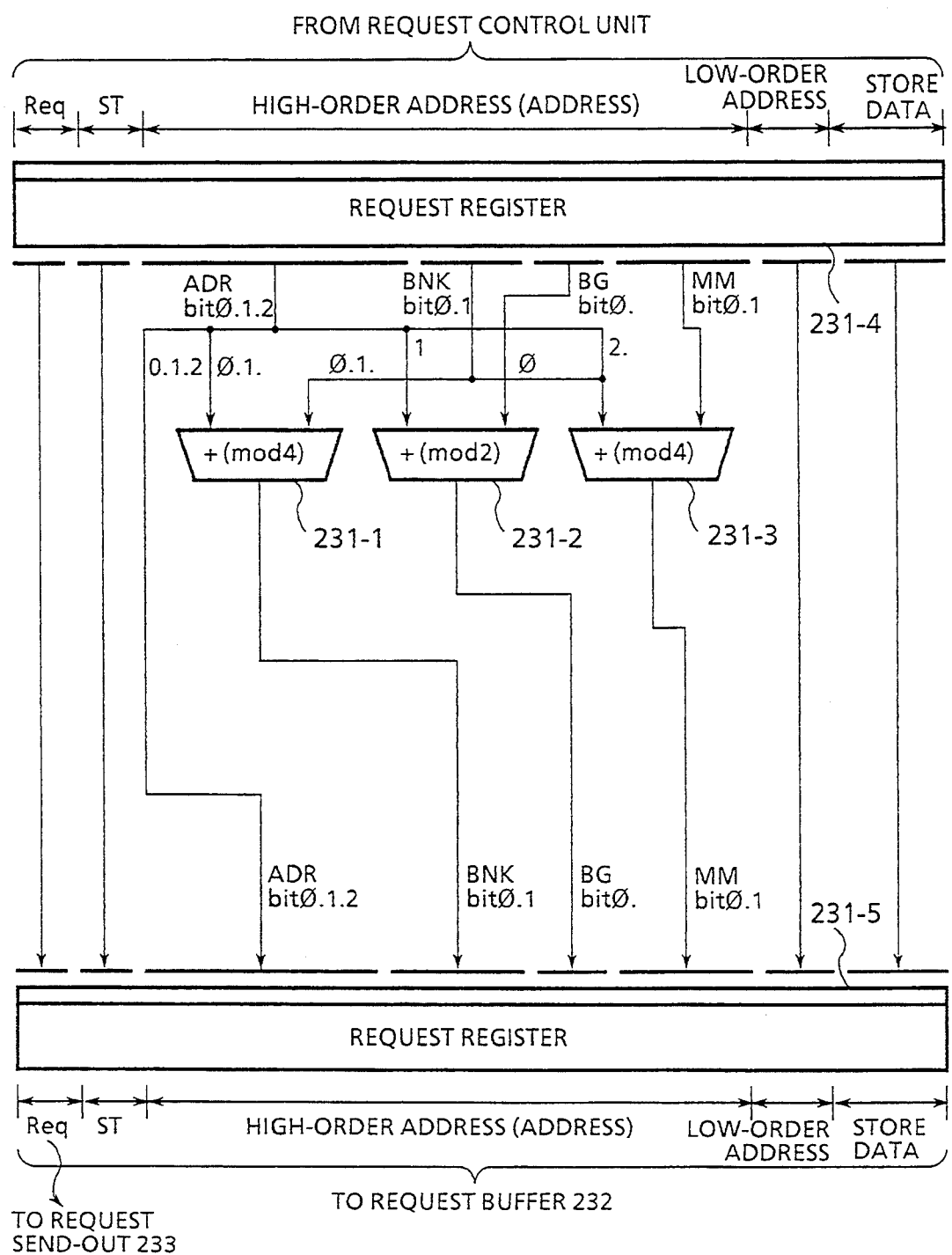
FIG. 12 is a schematic circuit diagram showing the structure of an address decode unit adopted in the storage control unit of FIG. 11.

FIG. 12 shows the configuration of the address decode unit 231 in a detailed block diagram. The address decode unit 231 includes two-bit adders 231-1 and 231-3 each being of modulo 4, a one-bit adder 231-2 of module 2, and request registers 231-4 and 231-5. The request register 231-4 is loaded with an access request supplied from associated one of request control units 191 to 194 and 196 to 199. The adder 231-1 adds the intra-bank address expressed by ADRbit0 and ADRbit1 to the bank number represented by BNKbit0 and BNKbit1 in modulo 4 to attain a result including bits BNKbit0 and BNKbit1 representing a bank number. In the addition, the carry is ignored (i.e. the addition is achieved in modulo 4). Data of BNKbit0 and BNKbit1 are added to data of ADRbit0 and ADRbit1 located at positions higher than the data by three bits (namely, eight times the original value) and then the result is attained in module 4. This is equivalent to an addition of one to the data of BNKbit0 and BNKbit1 each time the intra-bank address is incremented by eight. As a result, the addressing to the bank can be skewed for every eight elements.

Similarly, the adder 231-2 adds a portion of the bits representing the intra-bank address i.e. ADRbit1 to a portion of the bits expressing the bank number i.e. BJKbit0 in modulo 4 to attain a result of BGbit0. Data of BGbit0 is added to data of ADRbit1 located at positions higher than the data by four bits (namely, 16 times the original value) and then the result is attained in module 2. This is equivalent to an addition of one to the data of BGbit0 each time the intra-bank-group address is incremented by 16. As a result, the addressing to the bank group can be skewed for every 16 elements.

The adder 231-3 is disposed to add data of ADRbit2 and BNKbit0 to bit data of MMbit0 and MMbit1 representing a memory module number in the modulo 4 to thereby produce bit data of MMbit0 and MMbit1 denoting a memory module number. In the operation, the bit data MMbit0 and MMbit1 is added to the bit data ADRbit2 and BNKbit0 located at a position higher than the data MMbit0 and MMbit1 by four bits (namely, equivalent to 16 times the original value) to obtain a result of addition in the module 4. This is equivalent to an operation in which one is added to the data MMbit0 and MMbit1 each time the address is incremented by 16. Resultantly, the addressing to the memory module can be skewed for every 16 elements. The address conversion is thus accomplished, an access request containing the new address obtained from the conversion is set to the register 231-5. Moreover, the access request signal REQ is sent to the request buffer 232.

FIG. 4 shows relationships between original addresses and a memory module number, a bank group number, and a bank number generated by the circuit. In this diagram, MM#stands for a memory module number.

An access request containing the created address is transmitted from the register 231-5 to the request buffer 232. At the same time, the signal REQ contained in this request is delivered to request send-out unit 293.

The request buffer 232 notifies to the request send-out unit 293 a destination memory module number related to the oldest access request selected from the access requests retained in the queue. In the request send-out unit 293, whether or not the access request is to be transmitted is decided. If this is the case, a number assigned to either one of the priority units, for example, the number of the priority unit 270 is reported to the selector 234, which in turn feeds the access request to the priority unit 270. However, when a transmission suppression signal is being outputted from the request send-out unit 233, the access request is not transmitted. Moreover, when the selector 234 sends the access request, for example, to the priority unit 270, the request buffer 232 delivers an access request send-out or transmission signal to the request send-out unit 233. The processing of the request send-out unit 233 will be described later.

Each priority unit 270 includes request buffer units 230, 240, 250, and 260, request hold units 270-1, 270-2, 270-3, and 270-4 respectively associated with request buffer, a priority unit 270-7, and request accept controller 270-8. The request hold unit 270-1 includes a request queue 270-5 and a through path 270-6.

Either one of the request hold units 270-1 to 270-4 of the priority unit 270 receives an access request from the associated request buffer unit 230, 240, 250, or 260 to keep the access request in the request queue 270-5. Simultaneously, the received access request is delivered via the through path 270-6 to the priority logic 270-7.

In this connection, the request queue 270-5 is configured in one stage; however, there may be arranged an alternative queue structure. Namely, the queue may be constituted with a plurality of stages including a free space or an available space therein so that the access request is accepted to be linked to the final position of the queue 270-5. Simultaneously, the first access request in the queue 270-5 is supplied to the priority logic 270-7.

In the priority logic 270-7, the access requests held in the respective request hold units 270-1 to 270-4 are checked such that an access request to be next processed is selected therefrom in a predetermined priority order, thereby sending the selected request via a port 212 to the memory module MM0. In this situation, when a full state is indicated by a signal line e.g. the line 286 (FIG. 3) from a request queue disposed in association with a bank group e.g. the group 290 to which the access request is to be transmitted, the priority logic 270-7 does not include the access request in the priority decision.

On receiving the access request, the request accept controller 270-8 transmits an access request send-out completion signal to the request hold unit 270-1, 270-2, 270-3, or 270-4 having transmitted the access request to the memory module MM0.

When the send-out completion signal is received, the request hold unit (270-1, 270-2, 270-3, or 270-4) sets the request queue 270-5 to an empty or available state.

The request accept controller 270-8 sends a request accept signal 310 to the respective request buffer units 230, 240, 250, and 260. The request accept signal 310 is constituted with a number of a request buffer unit e.g. the number assigned to the request buffer unit 230 having received the request and a number e.g. the number of the priority unit 270 to which the request accept controller 270-8 belongs. In this regard, the request queue 270-5 is constructed in one stage. However, if a plurality of stages are disposed, the sequential number assigned to each of the request queues is incremented by one to set the final queue to the free state. The other priority units 271 to 273 also accomplish the similarly processing.

Next, description will be given of the processing flow of the request send-out unit 233 by reference to FIG. 13.

The request send-out unit 233 includes request buffer control unit 320 and four request queue control units 321 to 324 respectively associated with the priority units 270 to 273 (FIG. 11). Each request queue control units, for example, the request queue control unit 321 includes a counter 338 for counting the number of access requests which are sent from the request buffer 232 to an associated priority logic e.g. the logic 270 and which are not accepted yet. When the contents of the counter 338 denote a value other than zero, the selector 234 (FIG. 11) inhibits the subsequent access requests from being transmitted. Namely, the counter 338 is loaded with an initial value "0". The destination memory module number 343 indicated by the oldest access request supplied from the request buffer 232 is decoded by a decoder 325 so as to send a value "1" to an AND gate 339 in a request queue control unit e.g. the request queue control unit 321 corresponding to the memory module number. Consequently, the AND gate 339 outputs a value "1" in this state. This signal is fed via an AND gate 326 to a selector 234 as a signal denoting transmission of the access request to the priority unit 270. Moreover, in response to an output from the AND gate 326, an adder 337 produces an output signal to increment the content of the counter 338. The other request queue control units 322 to 324 also achieve the similar operation such that output signals therefrom are transmitted via AND gates 344 to 346 to the selector 234 (FIG. 11).

Thereafter, the request reception signal 310 inputted from either one of the priority units e.g. the priority unit 270 is delivered to one of the request control unit e.g. the unit 321 related to the priority unit 270. In the request control unit e.g. the unit 321, a number assigned to the request buffer unit 310 is compared with a number assigned to the own request buffer unit by a comparator 335. If these numbers are identical to each other, the content of the request queue counter 338 is decremented by one by a decrementer 336.

In the request buffer manage unit 320, when the access request signal REQ from the request decode unit 231 (FIG. 11) is "1", a value "1" is added to the value of the request counter 329 by an adder 327, thereby storing the result again in the counter 329. Moreover, when a request send-out signal 333 from the request buffer 232 (FIG. 11) is "1", a value "1" is subtracted from the value of the request counter 329 by a decrementer 328, thereby storing the result again in the counter 329. The counter 329 accordingly counts the number of access requests currently being held by the request buffer 232. In a comparator 330, a capacity C of the request buffer 232 (FIG. 11) is compared with the value of the request counter 329. If these values match each other, a request send-out suppression signal 334 is delivered to the request control unit 191. In a comparator 331, a value "0" is compared with the value of the request counter 329. If these values are equal to each other, a request control signal 342 is set to "0" by the AND circuit 326 to transmit the signal 342 to the selector 234 (FIG. 11), thereby suppressing transmission of an access request from the request buffer 232 (FIG. 11).

Referring now to FIG. 3, description will be given of the processing flow of the memory module MM0.

The respective memory modules are constructed to be responsive to two accesses received by the storage control units 210 and 211, respectively. For example, the memory module MM0 is disposed to accept via the lines 212 and 216 the access requests received by the priority unit 270 in each of the storage control units 210 and 211.

In the memory module MM0, the access requests received via the line 212 or 216 is fed to the priority units 280 and 281 disposed in association with the bank groups 290 and 300 so as to be queued in the request queues 282 to 285 at the respective entries thereof. In the priority logic 280, judgement is conducted to decide whether or not each of the access requests queued in the request queues 282 and 283 is associated with the bank group 290. If such an access request exists in both of these queues 282 and 283, a processing priority is decided therebetween. When an access request having a higher priority level is selected, either one of the banks 291 to 294 is determined according to a bank number contained in the selected access request, thereby transmitting the access request to the determined bank 291, 292, 293, or 294. The priority logic 281 also achieves the similar operation. In the priority circuit 280, when the request queues 282 and 283 are in the full state, in order to prevent any access request from being delivered to the request queues 282 and 283 in the full state, the priority circuit 270-7 removes the access request to be destined thereto from the objective items of priority selection.

When each of the request queues 282 and 283 has a sufficient space, even if access requests are consecutively issued to an identical bank or bank group, subsequent access requests to other banks or bank groups can be delivered to the associated request queues, thereby preventing the deterioration of the access performance.

In each of the banks 291 to 294, several machine cycles are required for the processing of an access request; consequently, when access requests are successively issued to an identical bank, the access performance is lowered. In this embodiment, assuming that four cycles are necessary for the processing of an access request in a bank, if the consecutive bank accesses are achieved on the mutually different banks, the access performance is not deteriorated. Accordingly, the addressing is carried out as shown in FIG. 4 to prevent the performance deterioration.

FIG. 14 shows relationships between the stride and the access performance developed in this embodiment. As can been seen from FIG. 14, in a wide range of stride values, the access performance is not so greatly reduced. However, with the stride set to a multiple of 64, 128, and 256, access requests are respectively concentrated onto the four banks, two banks, and one bank, thereby developing the performance represented as ½, 1/16, and 1/32. For comparison, description will now be given of access performance respectively obtained when element assignments other than those shown in FIGS. 2 and 4 are applied to the system of FIG. 1.

First, description will be given of a case where an addressing of FIG. 4 is modified to be used in the system.

FIG. 15 shows an addressing to be adopted in place of that of FIG. 4. In the addressing of the respective hierarchic levels of the memory modules, the bank groups, and the banks, there have been employed a skew scheme in which the address is skewed for every eight elements in the memory modules and bank groups and a skew scheme in which the address is skewed for every four elements in the banks.

In the address skew operation, the bank group count (eight in this embodiment) is used in place of the memory module count M in the first skew scheme represented by expression (1) so as to skew the memory module according to the bank group count. That is, the addressing of the memory modules is accomplished in accordance with the following expression (8).

$$MM\# = (ADR + ADR \div Bank\ group\ count) \bmod 4 \qquad (8)$$

This expression indicates that the number of kinds of stride leading to access request concentration onto a particular memory module is increased as compared with the skew scheme of expression (3). In the addressing to the other hierarchic levels (bank groups and banks), there are employed the the skew schemes in which addresses are skewed for every eight and four elements, respectively. As a result, using strides for which access requests are not concentrated on a particular memory module, the access concentration occurs neither on a particular bank nor on a particular bank group.

These addressing have been determined according to the following idea. Namely, when a skew scheme in which the address is skewed depending on the bank group count i.e. for every eight elements is adopted as the addressing of the memory modules, the maximum access performance is developed with a stride value represented by the following expression (9).

$$Maximum\ stride = Bank\ group\ count \div Number\ of\ storage\ control\ units \qquad (9)$$

In this embodiment including two storage control units, the maximum performance is attained with the stride set to four. For the bank groups and the banks, the address skew values are decided according to expressions (5) and (6) described above.

The addressing achieved depending on the addressing of FIG. 15 to the memory modules becomes to be equivalent to the addressing shown in FIGS. 34 and 35. FIGS. 16 and 17 respectively show addressing to bank groups in the memory module 0 and banks in the bank group 0.

FIG. 19 shows relationships between the stride and the access performance when the addressing of FIG. 15 is employed in place of that of FIG. 4. As can be seen by comparing FIG. 19 with FIG. 14, the access performance is slightly lowered when compared with the case where the addressing of FIG. 4 is used.

However, the performance is not decreased at all with the stride set to a multiple other than those of 8, 16, 32, 64, and 128. FIG. 18 shows a state of addressing with the stride value set to e.g. two. In this diagram, the shade portions indicate access requests issued from the request control unit of the requester module RM0 190 and a small circle designates an address to be accessed by an access request issued from the request control unit of the requester module RM1 191.

As can be seen from FIG. 18, of the first concurrent element group, the four starting elements i.e. addresses 0 and 2 and 4 and 6 are respectively in the MM0 and MM2; whereas, the four subsequent elements i.e. addresses 8 and 10 and 12 and 14 exist in the MM1 and MM3, respectively. In other words, two memory modules to be accessed by the four preceding elements differ from those to be accessed by the four subsequent elements. This also applies to eight elements in the next concurrent element group. In consequence, when the request control units 191 to 194 of the request module 190 are assigned with vector elements respectively having even serial numbers in each concurrent element group i.e. vector data controllers 171, 173, 175, and 177 respectively having even serial numbers and the request control units 196 to 199 of the request module 195 are assigned with vector elements respectively having odd serial numbers in each concurrent element group i.e. vector data controllers 172, 174, 176, and 178 respectively having odd serial numbers, the request modules 190 or 195 uniformly accesses the memory modules. Namely, there does not occur the disadvantage that accesses are concentrated onto a particular memory module.

Next, description will be given of the access performance of a case where the element assignment to the request control units of FIG. 2 is changed into that of FIG. 20 for comparison.

FIG. 20 shows an element assignment for comparison with that of FIG. 2. According to this assignment, the vector data controllers VD0 to VD7 are sequentially assigned to the request control units RQ0 to RQ7, respectively.

FIG. 22 shows relationships between the stride and the access performance attained when the element assignment above and the addressing of FIGS. 15 to 17 are applied to the vector processor of FIG. 1. Comparing FIG. 19 with FIG. 22, it can be seen in FIG. 22 that the performance deterioration appears also with the stride other than the multiples of 8 and 16, for example, with the stride set to "2", "4", or "6". Consequently, when a plurality of request modules are arranged, the number of stride kinds which lower the access performance can be decreased by adopting the element assignment method of FIG. 2.

In regard to the comparison example, FIG. 21 shows a state where an access is achieved with the stride set to two to an area beginning from address 0. In this diagram, a shade portion and the small circle respectively designate addresses to be accessed by access requests respectively issued from the request control units of the request modules RM0 and RM1, respectively.

As can be understood from this diagram, of the first concurrent element group, the four starting elements i.e. addresses 0 and 2 and 4 and 6 are respectively in the MM0 and MM2; whereas, the four subsequent elements i.e. addresses 8 and 10 and 12 and 14 exist in the MM1 and MM3, respectively. In other words, two memory modules to be accessed by the four preceding elements differ from those to be accessed by the four subsequent elements. This also applies to eight elements in the next concurrent element group. In consequence, when the request control units 191 to 194 of the request module 190 are assigned with four vector elements in each concurrent element group i.e. four preceding vector data controllers 171-174 and the request control units 196 to 199 of the request module 195 are assigned with four subsequent vector elements in each concurrent element group i.e. four succeeding vector data controllers 175 to 178, it can be appreciated that the access requests from the request module RM0 190 are concentrated onto the memory modules MM1 and MM3 and the access requests from the request module RM1 195 are concentrated onto the memory modules MM0 and MM2. This also applies to the other stride values which deteriorate the access performance.

Next, description will be given of the effect of provision of the request hold units 270- to 270-4 in the priority unit 270 by reference to an example employing the addressing of FIG. 4 and the element assignment of FIG. 2.

In the prior technology of FIG. 38, when the addressing is achieved according to FIGS. 33 to 35, the access performance is lowered with the stride se to seven as shown in FIG. 42. The same access pattern can be obtained with the stride set to 15 when the addressing of FIGS. 4 to 6 are applied to the system of the present invention shown FIG. 1. Description will now be given of a fact that the maximum access performance is attained with the stride set to 15 when access hold units are disposed in the embodiment.

Next, for simplification, description will be given of accesses conducted only by the request module 190 and the storage control unit 210 in the apparatus of FIG. 1.

FIG. 23 shows addresses of access requests issued from the request control units RQ0 191 to RQ3 194.

In the first machine cycle, since addresses "0", "30", "60", and "90" are respectively assigned to the memory modules MM0, MM3, MM3, and MM3 as shown in FIGS. 4 and 5, the associated access requests are respectively transmitted to the priority units 270, 273, 273, and 273.

The access requests to the addresses "0" and "15" are accepted, whereas those to addresses "30" and "60" are rejected and hence are held in the request queues 270-5 in the request hold units 270-3 and 270-4, respectively. This operation is different from that achieved in the conventional vector processor.

In the next machine cycle, since addresses "120", "150", "180" and "210" each are assigned to the memory module MM3, the relevant access requests are delivered to the priority unit 273.

In the priority unit 273, the access requests respectively from the request buffer units 230 and 240 to the addresses "120" and "150" are accepted; however, those from the request buffer units 250 and 260 to the addresses "180" and "210" are rejected since the request queue 270-5 is in the full state. Consequently, these access requests are held in the request buffers 252 and 262 of the request buffer units 250 and 260, respectively.

Assuming that the priority logic 270-7 in the priority unit 273 is formed in a configuration assigning the higher priority level to the older access request, the access request to the address "60" is processed in this situation.

According to the embodiment, in the subsequent machine cycle, since addresses "240", "270", "300", and "330" are assigned to the memory modules MM3, MM2, MM2, and MM2, respectively. Of these addresses, the address "150" appearing in advance in the request buffer unit 240 generating the address "270" has already been attached to the queue 270-3 in the priority unit 273. Consequently, the request to the address "270" is ready for an immediate transfer to the priority unit 272.

Accordingly, in this embodiment, without necessitating a wait operation for the processing of the access request to the address "150", the access request to the address "270" can be processed.

Figure 24:
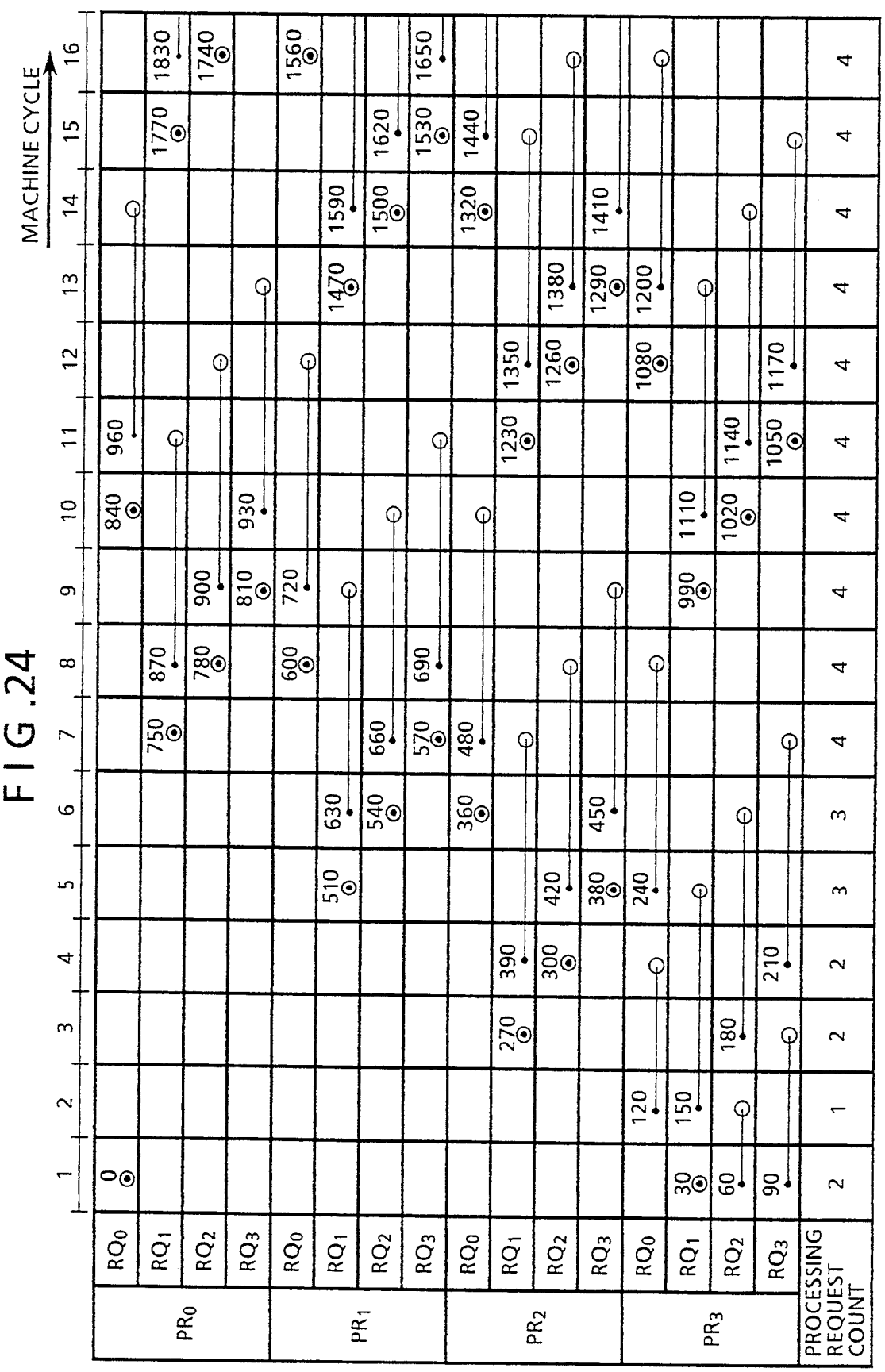
FIG. 24 is a diagram showing states of the access request groups processed in the address groups of FIG. 23 in the vector processor of FIG. 1.

FIG. 24 shows relationships between the respective machine cycles and access states therein. As can be seen from this diagram, the processing request count is four in the seventh and subsequent machine cycles. Namely, the maximum processing performance is developed.

Although the embodiment includes two requester modules, the present invention is not restricted by the embodiment. For example, the present invention is also effectively applicable to a case where three or more requester modules are used. In such a case, it is desirable that the system includes three storage control units and each of the memory modules is constituted with three bank groups. Moreover, although the embodiment above includes four memory modules, the present invention is not restricted by the embodiment. The present invention is also applicable to a case employing any number of memory modules, the number being less than an arbitrary element concurrence grade.

When it is desired to utilize the element assignment described above according to the present invention, namely, the assignment of request control units to the vector data controllers in a case adopting, for example, three or more requester modules, the user need only achieves the component assignment as follows.

It is only necessary to assign an a-th element in an identical concurrent element group i.e. an a-th vector data controller to a request module having a module number which is equal to a remainder attained by subdividing the value of a by the requester module count.

Moreover, in the description above, the element assignment is accomplished according to the requester module count. However, since a storage control unit is disposed for each of the requester modules in the embodiment, the number of storage control units may be employed in place of the request module count in the description.

Furthermore, since each storage control unit concurrently receives as many access requests as there are memory modules in the embodiment, the characteristic of the present invention may also be described according to the memory module count as follows.

That is, based on the memory module count less than the element concurrent grade, the request control units need only be classified into groups such that an a-th element of an identical concurrent element group i.e. an a-th vector data controller is assigned to one of the request control unit groups which has a number equal to a remainder obtained by dividing the value of a by the number of request control unit groups. Resultantly, access requests from a plurality of request control units respectively belonging the request control unit groups are accepted by storage control units arranged in association of the request control units.

Embodiment 2

Next, FIG. 25 shows the primary portion of a vector processor in a second embodiment according to the present invention. The other portions are identical to those of FIG. 1 and hence are not shown. In this diagram, the same constituent elements as those of FIG. 1 are assigned with identical reference numerals. Moreover, in a unit attained by partially modifying a unit adopted in FIG. 1, the reference numerals of FIG. 1 are marked with a letter "A".

In this apparatus, there are missing the request hold units 270-3 (FIG. 11) adopted in each of the priority units 270A to 273A in the first embodiment shown in FIG. 1. In association therewith, a request send-out unit 233A is different from that used in the first embodiment.

This embodiment also utilizes the element assignment of FIG. 2 like in the first embodiment.

Figure 26:
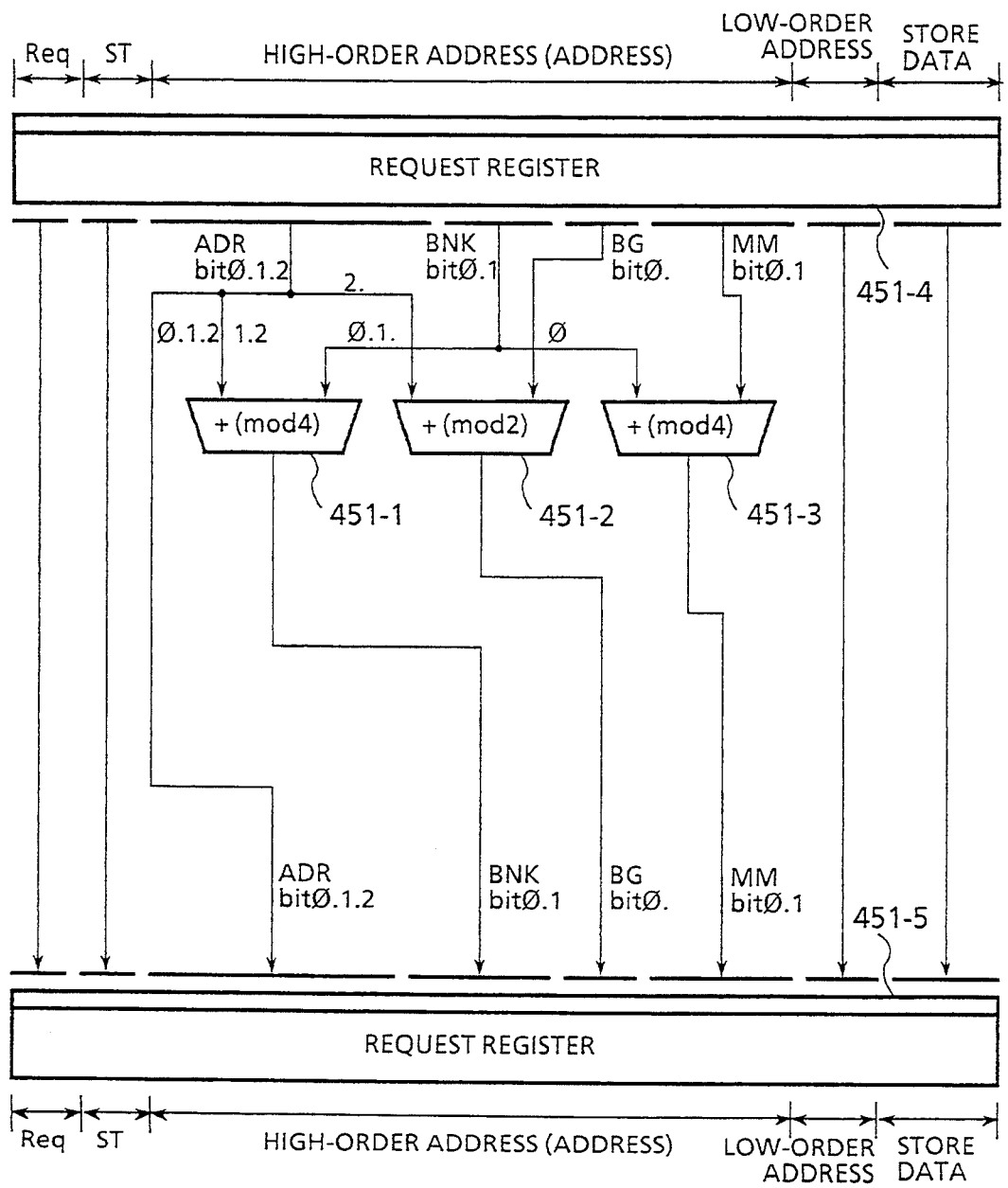
FIG. 26 is a diagram showing the circuit configuration of an address decode unit employed in the vector processor of FIG. 25.

In this embodiment, an addressing of FIG. 31 is employed in place of that adopted in the first embodiment. Accordingly, an address decode unit 231A is configured as shown in FIG. 26. Namely, the address decode unit 451 includes adders 451-1 to 451-3 and request registers 451-4 and 451-5. The adder 451-1 adds data of ADRbit1 and ADRbit2 to data of BNKbit0 and BNKbit1 to obtain a result in modulo 2, the adder 451-2 adds data of BGbit0 to data of ADRbit2 to attain a result in modulo 2, and the adder 451-3 adds data of MMbit1 and MMbit2 to data of BNKbit0 and BNKbit1 to obtain a result in modulo 4.

An operation in which data of MMbit0 and MMbit1 is added to data of BNKbit0 and BNKbit1 located at positions respectively higher than MMbit0 and MMbit1 by three bits (i.e. equivalent to eight times the original value) to attained a result in modulo 4 means an operation in which one is added to the data of BNKbit0 and BNKbit1 each time the address is incremented by eight. With this provision, the addressing to the memory modules undergoes a skew operation for every eight elements.

Moreover, an addition of BGbit0 to ADRbit2 at a location higher than BGbit0 by three bits (i.e. equivalent to eight times the original value) to obtain a result in modulo 2 means an addition of one to BGbit0 for every eighth address in the bank groups. Accordingly, the addressing to the bank groups is subjected to a skew operation for every eight elements.

An addition of data of BNKbit0 and BNKbit1 to data of ADRbit1 and ADRbit2 at a location higher than BNKbit0 and BNKbit1 by two bits (i.e. equivalent to four times the original value) to attain a result in modulo 4 means an addition of one to the data of BNKbit0 and BNKbit1 for every fourth address in the banks. Accordingly, the addressing to the banks can be skewed for every four elements.

Figure 27:
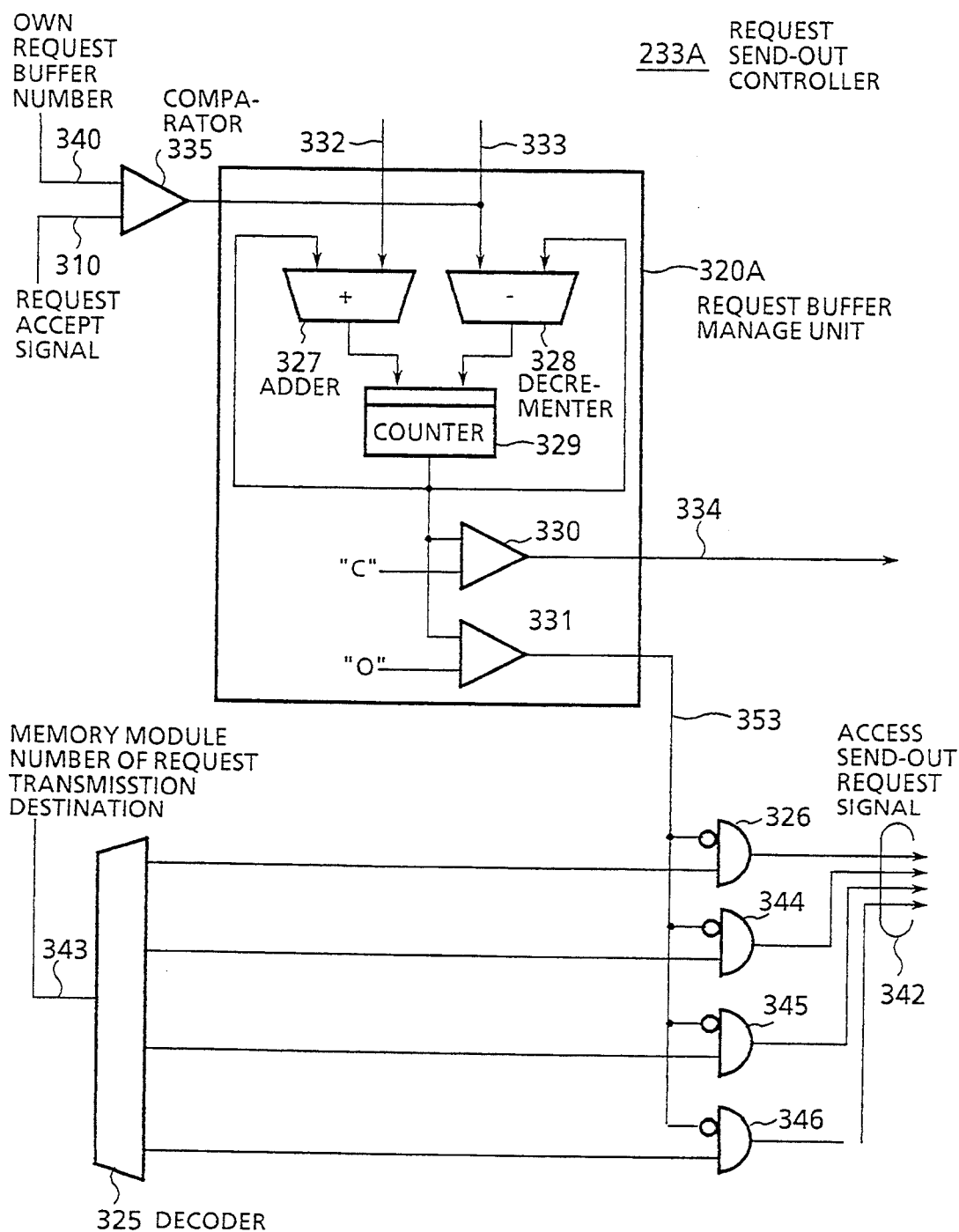
FIG. 27 is a block diagram showing a request send-out unit used in the vector processor of FIG. 25.

FIG. 27 shows the request send-out unit 233A in a detailed diagrammatic illustration.

Figure 13:
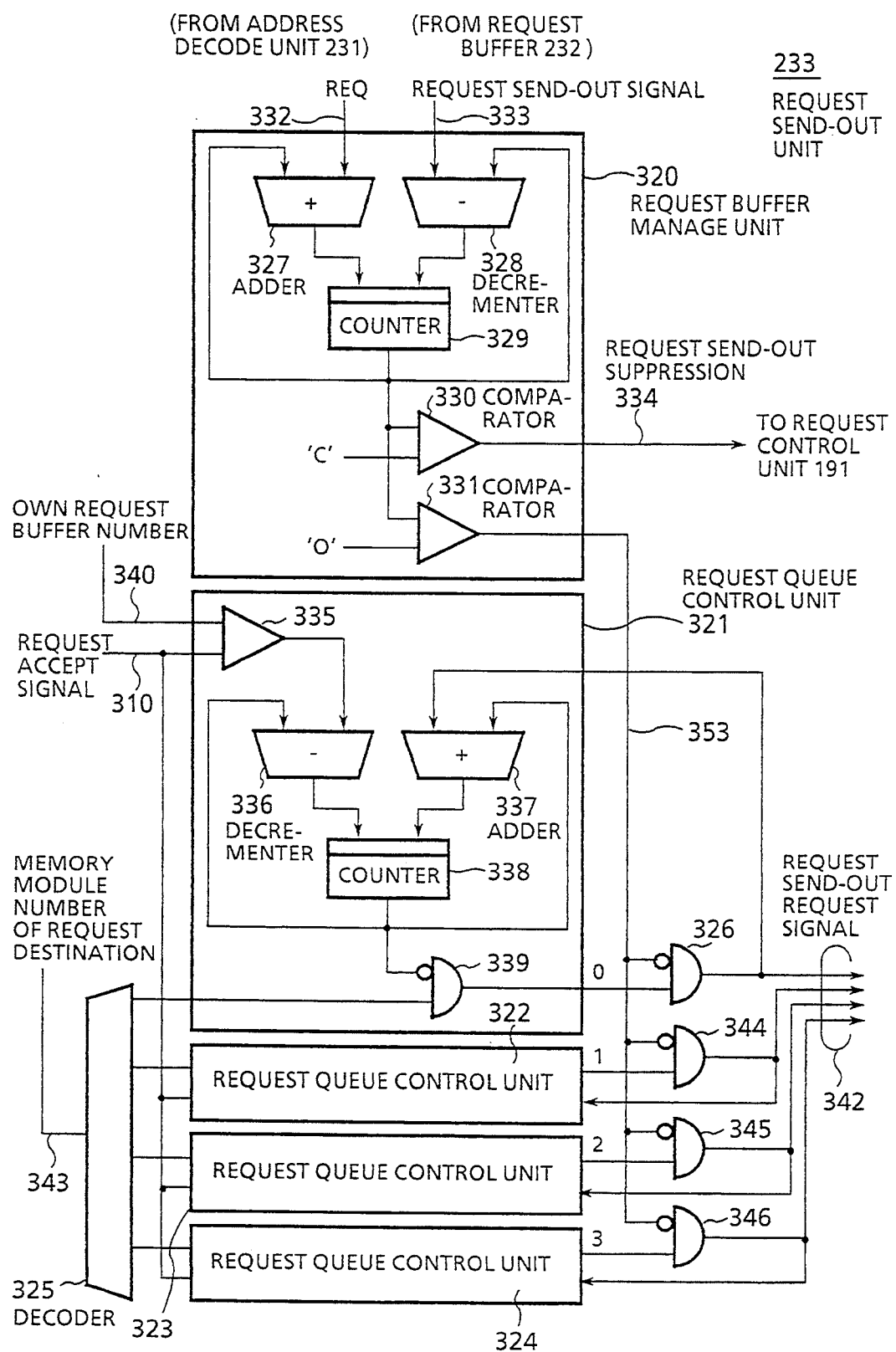
FIG. 13 is a block diagram showing request queue control unit used in the vector processor of FIG. 1.

In this diagram, a request buffer manage unit 320A is configured in the same manner as shown in FIG. 13.

The request queue control units 321 to 324 of FIG. 13 are missing in FIG. 27. The request send-out unit 233A is basically constituted to unconditionally transmit any access request from the access request buffer 232 (FIG. 25) in any situation. Namely, like in the first embodiment, a destination memory module number 343 fed from the request buffer 232 (FIG. 25) is decoded by the decoder 324. In this embodiment, the decoded signal is directly sent as a selection signal 342 via either one of the AND gates 326 and 344 to 346 to the selector 234 (FIG. 25), which is different from the operation of the first embodiment. The AND gates 326 and 344 to 346 respectively correspond to the priority units 270 to 273 like in the embodiment 1. In response to the selection signal 342 thus transmitted, an access request is issued from the selector 234 to either one of the priority units 270 like in the first embodiment. In a case where a request accept signal 310 is transferred from the destination priority unit e.g. the unit 270 having received the transmitted access request, comparison is made between the number assigned to the request buffer unit and the contents of the access request. The request buffer manage unit 320A controlling the AND gates 326 and 344 to 346 are different from that shown in FIG. 13 only in the following point. Namely, a matching signal from the comparator 335 is utilized as a count-down signal for triggering the counter 329 to count the number of access requests in the associated access request buffer. In other words, after the transmitted access request is accepted, the count value is decremented in the counter 329.

In this embodiment, the addressing of FIG. 15 is adopted in place of that of FIG. 4 employed in the first embodiment. This is because that the request hold units of the first embodiment are missing in the priority units 270 of FIG. 25. When the request hold units are missing, the congestion of access requests cannot be mitigated at the request buffer exit as described in conjunction with the prior art example of FIG. 42 and hence the access performance is decreased.

Relationships between the stride and the access performance of this embodiment are the same as those of FIG. 19. In consequence, as can be seen from comparison between FIG. 19 and FIG. 14 representing the relationships between the stride and the access performance of the first embodiment, the access performance is slightly lowered. However, also in this embodiment, when the element assignment method of FIG. 20 is employed in place of that shown in FIG. 2, the relationships between the stride and the access performance become to be identical to those of FIG. 22 for the same reasons as described in conjunction with the first embodiment. This consequently proves the efficiency of the element assignment of FIG. 2.

Embodiment 3

In the first embodiment, the request hold unit 270-5 (FIG. 11) is disposed in the priority unit 270. The circuit configuration of the request hold unit is also applicable to a vector processor different from that of the first embodiment, for example, a vector processor including only one request module.

Figure 28:
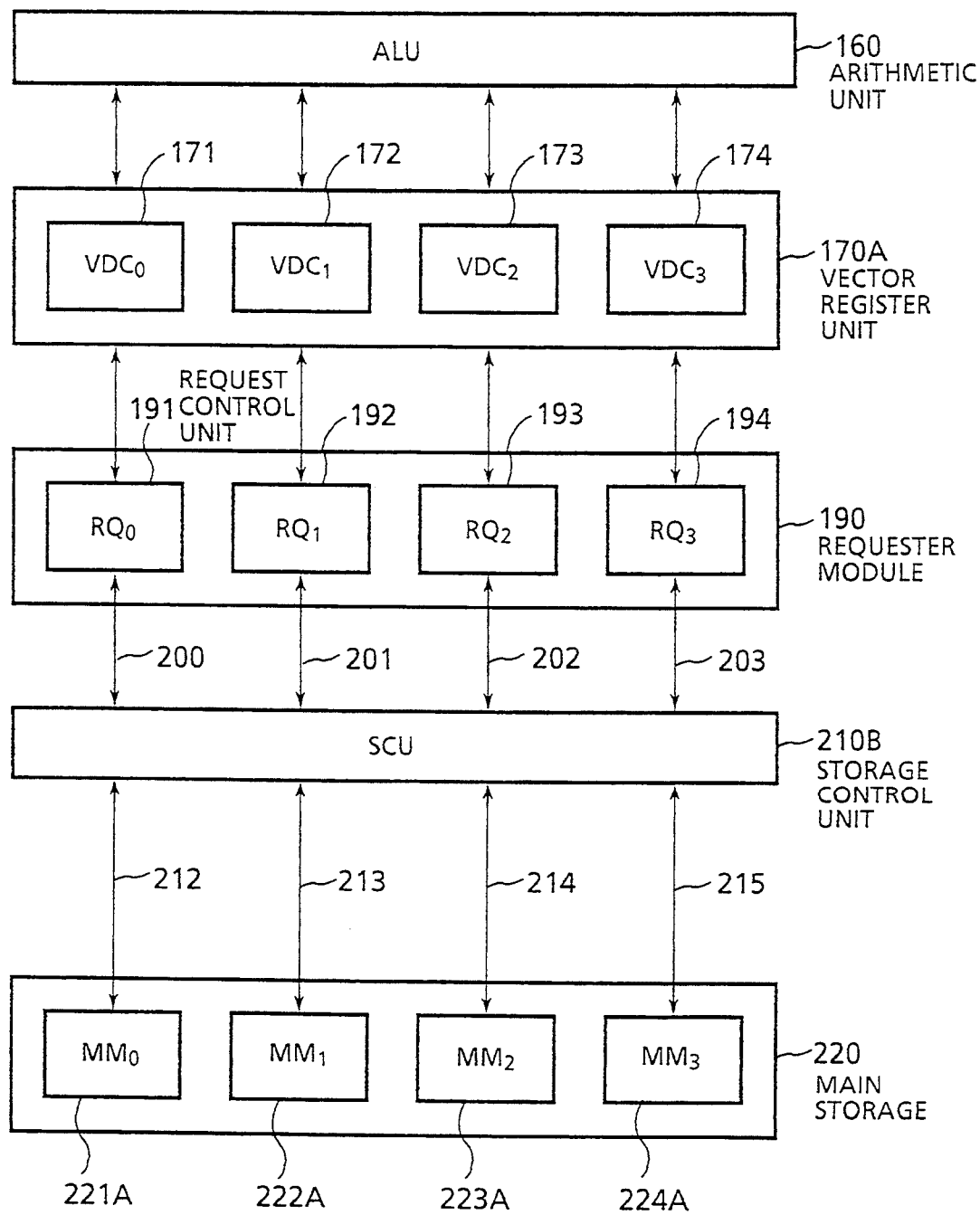
FIG. 28 is a schematic diagram showing the primary portion of a vector processor in a third embodiment according to the present invention.
Figure 32:
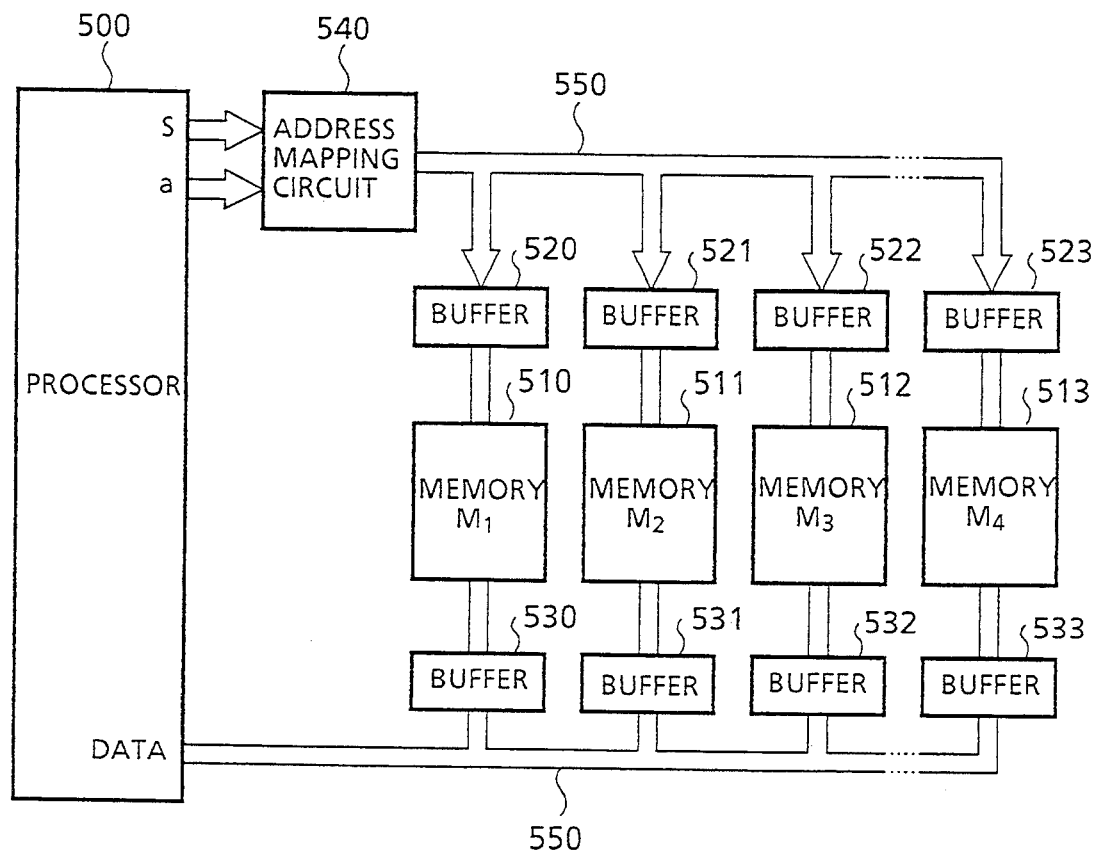
FIG. 32 is a schematic diagram showing the configuration of a conventional vector processor of the sequential processing type.

FIG. 28 shows the constitution of such a vector processor including only one request module. In this configuration, the same constituent elements as those of FIG. 1 are assigned with the same reference numerals. The element concurrence grade of the vector processor is four. Namely, four vector data controllers VDC0 171 to VDC3 174 are arranged in a vector register unit 170A to be respectively connected to request control units RQ0 191 to RQ3 194 respectively associated therewith. This configuration is different from that used in the first embodiment. The storage control unit 210 is structured in the same manner as for the first embodiment of FIG. 11.

For the addressing, memory modules 221A, 222A, 223A, and 224A each are different from those of the first embodiment, namely, only one memory bank group is disposed. In this embodiment, it is to be noted that the configuration thereof includes only one requester module and only one storage control unit.

Description will now be given of a method of assigning addresses to the memory modules.

Namely, a given address is divided by an integer m larger than the memory module count M, the attained quotient is added to a number k which is prime with respect to the memory module count M (i.e. "1" is only one common divisor therebetween) so as to decrement the result of the addition by one. The address value is then added to the obtained difference and the resultant value is divided by the memory module count to attain a remainder, thereby assigning the address to a memory module having a memory module number identical to the remainder.

The integer m designates a skew magnitude to be applied to the memory module when the address value is increased by a predetermined value in the addressing.

The integer k denotes a skew magnitude for a memory module in an addressing. In this example, the addressing is conducted with m=8 and k=1. In this case, the addressing becomes to be identical to the known addressing represented by expression (2) and shown in FIGS. 34 and 25. Namely, each time the address value is incremented by eight, the memory module is skewed accordingly.

The number of stages of request queues (e.g. the queue 90-5) of the request hold unit (e.g. the unit 90-1) is set to an integer S not exceeding a value attained through a computation of $m \div N - m \div (N \times N)$, where N stands for the number of request control units.

For example, assuming that the request control unit count N=4 and m=8, the computation is achieved as $m \div N - m \div (N \times N) = 8 \div 4 - 8 \div (4 \times 4) = 1.5$. Consequently, S=1 results and the number of stages is set to one or more.

Since the operation of the apparatus of this embodiment can be easily understood from the first embodiment, description will next be given only of the primary portion thereof.

First, the access operation will be described with the address increment value set to eight.

Assuming the first address to be "0", access requests issued in the first machine cycle respectively from the request control units 191 to 194 are associated with addresses "0", "8", "16", and "24".

Since the addresses "0", "8", "16", and "24" are respectively assigned to the memory modules MM0 to MM3, the access requests are transmitted to the priority units 270 to 273, respectively.

In each of the priority units 270 to 273, only one access request can be processed in a machine cycle. Consequently, the access requests each passed to the associated priority units 270 to 273 can be completely processed.

This also applies to the subsequent access requests.

This means that the maximum access performance is developed in this situation.

Next, description will be given of an access operation in which the address increment value is set to seven.

In the respective machine cycles, the request control units RQ0 191 to RQ3 194 issue access requests to addresses as shown in FIG. 41.

In the first machine cycle, since addresses "0", "7", "14", and "21" are respectively assigned to the memory modules MM0 to MM3, these access requests are sent to the priority units 270 to 273, respectively.

The access requests to the addresses "0" and "7" are then processed, whereas the access requests to the addresses "14" and "21" are not immediately processed, namely, retained in the request queues in the access hold units 273-3 and 273-4 of the priority unit 273.

In the subsequent machine cycle, since addresses "28", "35", "42" and "49" each are assigned to MM3, these access requests are sent to the priority unit 273.

The priority unit 273 accepts the access requests from the request buffer units 230 and 240 to the addresses "28" and "35". However, the access requests from the request buffer units 250 and 260 to the addresses "42" and "49" are rejected because the request queues associated therewith are in the full state. In consequence, these access requests are kept in the request buffers 250-2 and 260-2 of the request buffer units 250 and 260, respectively.

Assuming that the older access request takes precedence over the other access requests in the processing achieved by the priority logic 273-7, the access request to the address "14" is processed.

FIG. 29 shows access states in the respective machine cycles.

In this diagram, "PR0", "PR1", "PR2", and , "PR3" denote priority units 270 to 273, respectively; whereas, "RQ0", "RQ1", "RQ2", and "RQ3" designate request control units 191 to 194, respectively. Moreover, a dot denotes a timing when an access request is transmitted to either one of the priority logics 270-7, 271-7, 272-7, and 272-7; whereas, a circle indicates a timing when an access request is delivered to either one of the memory modules MM0 to MM3. When a dot is linked with a circle, it is designated that the pertinent access request is kept in a wait state for selection by the priority logics 270-7, 271-7, 272-7, and 272-7. The number of processing requests denote the number of access requests processed in each machine cycle.

As can be seen from FIG. 29, the processing request count is four in the seventh and subsequent machine cycles. Namely, the maximum processing performance is attained in this situation.

Relationships between the address increment value i.e. the stride and the access processing performance are identical to those of FIG. 14.

For a stride which is a multiple of 16 and which is other than the multiples of 32, the access processing performance becomes to be half the maximum performance.

For a stride which is a multiple of 32 and which is other than the multiples of 64, the access processing performance becomes to be one fourth of the maximum performance.

For a stride which is a multiple of 64 and which is other than the multiples of 128, the access processing performance becomes to be one eighth of the maximum performance. For a stride which is a multiple of 128 and which is other than the multiples of 256, the access processing performance becomes to be one 16th of the maximum performance. For a stride which is a multiple of 256, the access processing performance becomes to be 1/32 of the maximum performance.

However, when the stride takes a value other than those above, the maximum access processing performance is developed.

As can be seen from comparison between FIGS. 29 and 42 and between FIGS. 14 and 40, in the vector processor of this embodiment, the access processing performance can be improved thanks to the skew scheme represented by expression (2) or shown in FIGS. 34 and 35.

According to a feature of the present invention, there can be obtained a vector processor having a simple circuit structure and a high element concurrence grade.

Moreover, according to another feature of the present invention, the frequency of appearance of the address increment values deteriorating the access performance is decreased and hence there can be obtained a vector processor achieving a concurrent element processing and developing a high access processing performance in the overall system operation.

As many apparently widely different embodiments of the present invention can be made without departing from the spirit and scope thereof, it is to be understood that the invention is not limited to the specific embodiments thereof except as defined in the appended claims.

1. A vector processor comprising:
 a storage for storing vector data therein including a plurality (M) of memory modules;
 a plurality (N) of requesters for concurrently issuing access requests for a plurality (N) of vector elements belonging to each of a plurality of concurrent element groups obtained by subdividing vector data stored in said storage, the value N being n times the value M, n being an integer greater than one, said requesters being divided into n requester groups;
 a plurality of (n) storage control units each disposed in correspondence to one of said requester groups, each storage control unit being connected to said memory modules and to plural requesters belonging to a corresponding one of said requester groups, each storage control unit transferring a plurality of access requests concurrently supplied from plural requesters belonging to said corresponding requester group to one or plural ones of said memory modules to which addresses contained in the access requests belong,
 each storage control unit concurrently transferring plural ones among a plurality of access requests supplied thereto, which plural ones contain addresses respectively belonging to mutually different ones of said memory modules, to said different memory modules and sequentially transferring plural ones of a plurality of access requests supplied thereto, which plural ones contain addresses belonging to an identical one of said memory modules, to said identical memory module;
 each memory module including plural memory bank groups and a plurality of access circuits each provided in correspondence to one of said memory bank groups, said memory bank groups including memory banks assigned with mutually different addresses, a total number of the memory bank groups being not less than the number (n) of said plurality of storage control units.

2. A vector processor according to claim 1, wherein:
 each memory module further includes a plurality of request queue groups each corresponding to one of said plural memory bank groups included in said each memory module,
 each request queue group including a plurality of request queues respectively connected to said plural storage control units and to one of said access circuits disposed in association with one of said memory bank groups corresponding to said each request queue group, said request queues being disposed respectively in association with said plural storage control units,
 each request queue in each said request queue group temporarily retaining an access request supplied from one of said storage control units associated with each request queue until the supplied access request is accepted by said associated access circuit.

3. A vector processor comprising:
 a storage for storing vector data therein including a plurality (M) of memory modules;
 a plurality (N) of requesters for concurrently issuing access requests for a plurality (N) of vector elements belonging to each of a plurality of concurrent element groups obtained by subdividing vector data stored in said storage, the value N being n times the value M, n being an integer greater than one, said requesters being divided into n requester groups;
 a plurality of (n) storage control units each disposed in correspondence to one of said requester groups each storage control unit being connected to said memory modules and to plural requesters belonging to a corresponding one of said requester groups, each storage control unit transferring a plurality of access requests concurrently supplied from plural requesters belonging to said corresponding requester group to one or plural ones of said memory modules to which addresses contained in the access requests belong, each storage control unit concurrently transferring plural ones among a plurality of access requests supplied thereto, which plural ones contain addresses respectively belonging to mutually different ones of said memory modules, to said different memory modules and sequentially transferring plural ones of a plurality of access requests supplied thereto, which plural ones contain addresses belonging to an identical one of said memory modules to said identical memory module, each memory module including plural memory bank groups and an access circuit connected to said plural storage control units and to said memory bank groups within said each memory module, said memory bank groups respectively assigned with mutually different addresses, a total number of the memory bank groups being not less than a number (n) of said plurality of storage control units, said access circuit transferring each of a plurality of access requests concurrently supplied thereto from said plurality of storage control units to one of said memory bank groups to which an address included in said each access request belongs;

wherein said plural memory modules are assigned with addresses in such a manner that successive addresses are sequentially assigned to different ones of said memory modules in accordance with a predetermined sequence of memory modules, and are assigned, for every first predetermined number of addresses, to one of said memory modules different from one of said memory modules determined according to the sequence of memory modules.

4. A vector processor according to claim 3, wherein:
each storage control unit includes:
a plurality of priority units each disposed in association with and connected to one of said plural memory modules, each priority unit selecting one of a plurality of access requests supplied thereto and transmitting the selected access request to a memory module corresponding thereto; and
a plurality of request send-out units each disposed in association with and connected to one of said requesters belonging to a requester group corresponding to said each storage control unit for judging one of the memory modules to which addresses respectively contained in the access requests respectively supplied from said requesters associated therewith respectively belong and for transmitting the access requests to said priority units respectively disposed in association with said memory modules,
each of said priority units including:
a plurality of request queues each disposed in association with and connected to one of said plural request send-out units for temporarily holding access requests transmitted from said request send-out units respectively associated therewith to each of said priority units; and
a priority logic for selecting one of the plural access requests held in said plural request queues and transferring the selected access request to one of said memory modules corresponding to each priority, unit;
each request send-out unit including:

means for judging a memory module to which an address contained in the access request supplied from said associated requester belongs; and
means connected to said judging means for controlling, in accordance with whether or not an empty area exists in a request queue disposed in one of said priority units related to said judged memory module, whether or not the access request is to be transmitted to said priority units disposed in association with said judged memory module.

5. A vector processor according to claim 4, wherein:
the first predetermined number is not less than a total number of said memory bank groups included in said plural memory modules.

6. A vector processor according to claim 5, wherein:
said plural bank groups within each memory module is assigned with a plurality of addresses assigned to said each memory module in such a manner that the plurality of addresses are sequentially assigned to different ones of said bank groups in a predetermined sequence of bank groups, and are assigned for every second predetermined number of addresses, to one of said bank groups different from one of said bank groups determined according to the sequence of bank groups.

7. A vector processor according to claim 6, wherein:
the second predetermined number is identical to a value obtained as a quotient by dividing by a total number of said memory modules a result attained by multiplying the total number of said memory bank groups included in said plural memory modules by a quotient attained by dividing the first predetermined number by the number of said storage control units.

8. A vector processor according to claim 7, wherein:
said plural banks belonging to each bank group within each memory module are assigned with a plurality of addresses assigned to said plural banks in such a manner that the plurality of addresses are sequentially assigned to different ones of said banks in a predetermined sequence of banks, and are assigned for every third predetermined number of addresses, to one of said banks different from one of said banks determined according to the sequence of banks.

9. A vector processor according to claim 8, wherein:
the third predetermined number is identical to a value of a quotient attained by dividing the first predetermined number by the number of said plural storage control units.

10. A vector processor according to claim 3, wherein:
each storage control unit includes:
a plurality of priority units each disposed in association with and connected to one of said plural memory modules, each priority unit selecting one of a plurality of access requests supplied thereto for transmitting the selected access request to one of said memory modules corresponding thereto; and
a plurality of request send-out units each disposed in association with and connected to one of said requesters belonging to one of said requester groups corresponding to each storage control unit for judging memory modules to which addresses respectively contained in the access requests respectively supplied from said requesters associated therewith respectively belong and for transmitting the access requests to said priority units respectively disposed in association with said memory modules, each priority unit selecting one of the plural access requests sent from said plural request send-out units thereto and transferring the selected access request to one of said memory modules corresponding to each priority unit, each request send-out unit judging one of said memory modules to which an address contained in the access request supplied from said associated requester belongs and transmitting the access request to one of said priority units disposed in association with said judged memory module, and each request send-out unit further controlling, in accordance with whether or not the transmitted access request is selected by said one priority unit, whether or not an access request subsequently supplied from said associated requester is to be transmitted to said one priority unit.

11. A vector processor according to claim 10, wherein:
the first predetermined number is identical to the number of said plural memory modules.

12. A vector processor according to claim 11, wherein:
said plural bank groups within each memory module is assigned with a plurality of addresses assigned to said each memory module in such a manner that the plurality of addresses are sequentially assigned to different ones of said bank groups in a predetermined sequence of bank groups, and are assigned for every second predetermined number of addresses, to one of said bank groups different from one of said bank groups determined according to the sequence of bank groups.

13. A vector processor according to claim 12, wherein:
the second predetermined number is identical to a value obtained as a quotient by dividing by a total number of said memory modules a result attained by multiplying the total number of said memory bank groups included in said plural memory modules by a quotient attained by dividing the first predetermined number by the number of said storage control units.

14. A vector processor according to claim 13, wherein:
said plural banks belonging to each bank group within each memory module are assigned with a plurality of addresses assigned to said plural banks in such a manner that the plurality of addresses are sequentially assigned to different ones of said banks in a predetermined sequence of banks, and are assigned for every third predetermined number of addresses, to one of said banks different from one of said banks determined according to the sequence of banks.

15. A vector processor according to claim 14, wherein:
the third predetermined number is identical to a value of a quotient attained by dividing the first predetermined number by the number of said plural storage control units.

16. A vector processor according to claim 3, wherein:
the first predetermined number is not less than a total number of said memory bank groups included in said plural memory modules.

17. A vector processor according to claim 16, wherein:
said plural bank groups within each memory module is assigned with a plurality of addresses assigned to said each memory module in such a manner that the plurality of addresses are sequentially assigned to different ones of said bank groups in a predetermined sequence of bank groups, and are assigned for every second predetermined number of addresses, to one of said bank groups different from one of said bank groups determined according to the sequence of bank groups.

18. A vector processor according to claim 17, wherein:
the second predetermined number is identical to a value obtained as a quotient by dividing by a total number of said memory modules a result attained by multiplying the total number of said memory bank groups included in said plural memory modules by a quotient attained by dividing the first predetermined number by the number of said storage control units.

19. A vector processor according to claim 18, wherein:
said plural banks belonging to each bank group within each memory module are assigned with a plurality of addresses assigned to said plural banks in such a manner that the plurality of addresses are sequentially assigned to different ones of said banks in a predetermined sequence of banks, and are assigned for every third predetermined number of addresses, to one of said banks different from one of said banks determined according to the sequence of banks.

20. A vector processor according to claim 19, wherein:
the third predetermined number is identical to a value of a quotient attained by dividing the first predetermined number by the number of said plural storage control units.

21. A vector processor according to claim 3, wherein:
the first predetermined number is identical to the number of said plural memory modules.

22. A vector processor according to claim 21, wherein:
said plural bank groups within each memory module is assigned with a plurality of addresses assigned to said each memory module in such a manner that the plurality of addresses are sequentially assigned to different ones of said bank groups in a predetermined sequence of bank groups, and are assigned for every second predetermined number of addresses, to one of said bank groups different from one of said bank groups determined according to the sequence of bank groups.

23. A vector processor according to claim 22, wherein:
the second predetermined number is identical to a value obtained as a quotient by dividing by a total number of said memory modules a result attained by multiplying the total number of said memory bank groups included in said plural memory modules by a quotient attained by dividing the first predetermined number by the number of said storage control units.

24. A vector processor according to claim 23, wherein:

said plural banks belonging to each bank group within each memory module are assigned with a plurality of addresses assigned to said plural banks in such a manner that the plurality of addresses are sequentially assigned to different ones of said banks in a predetermined sequence of banks, and are assigned for every third predetermined number of addresses, to one of said banks different from one of said banks determined according to the sequence of banks.

25. A vector processor according to claim 24, wherein:
the third predetermined number is identical to a value of a quotient attained by dividing the first predetermined number by the number of said plural storage control units.

26. A vector processor comprising:
a storage for storing vector data therein including a plurality (M) of memory modules;
a plurality (N) of requesters for concurrently issuing access requests for a plurality (N) of vector elements belonging to each of a plurality of concurrent element groups obtained by subdividing vector data stored in said storage, the value N being n times the value M, n being an integer greater than one, said requesters being divided into n requester groups;
a plurality of (n) storage control units each disposed in correspondence to one of said requester groups, each storage control unit being connected to said memory modules and to plural requesters belonging to a corresponding one of said requester groups, each storage control unit transferring a plurality of access requests concurrently supplied from plural requesters belonging to said corresponding requester group to one or plural ones of said memory modules to which addresses contained in the access requests belong;
each storage control unit concurrently transferring plural ones among a plurality of access requests supplied thereto, which plural ones contain addresses respectively belonging to mutually different ones of said memory modules to said different memory modules and sequentially transferring plural ones of a plurality of access requests supplied thereto, which plural ones contain addresses belonging to an identical one of said memory modules, to said identical memory module,
each memory module including:
plural memory bank groups, and an access circuit connected to said plurality of storage control units and to said memory bank groups within said each memory module, said memory bank groups being assigned with mutually different addresses, a total number of the memory bank groups being not less than a number (n) of said plurality of storage control units, said access circuit transferring each of a plurality of access requests concurrently supplied thereto from said plurality of storage control units to one of said memory bank groups to which an address included in said each access request belongs, wherein:
each requester belongs to a requester group having a serial number equal to a value of a remainder attained by dividing an element number (a) within a concurrent element group, assigned to an element for which said each requester is to issue a request, by a total number (n) of said requester groups.

27. A vector processor according to claim 26, wherein:
said plural memory modules are assigned with addresses in such a manner that successive addresses are sequentially assigned to different ones of said memory modules in accordance with a predetermined sequence of memory modules, and are assigned, for every first predetermined number of addresses, to one of said memory modules different from a memory module determined according to the sequence of memory modules.

28. A vector processor according to claim 27, wherein:
the first predetermined number is not less than a total number of said memory bank groups included in said plural memory modules.

29. A vector processor according to claim 28, wherein:
said plural bank groups within each memory module is assigned with a plurality of addresses assigned to said each memory module in such a manner that the plurality of addresses are sequentially assigned to different ones of said bank groups in a predetermined sequence of bank groups, and are assigned, for every second predetermined number of addresses, to one of said bank groups different from one of said bank groups determined according to the sequence of bank groups.

30. A vector processor according to claim 29, wherein:
the second predetermined number is identical to a value obtained as a quotient by dividing by a total number of said memory modules a result attained by multiplying the total number of said memory bank groups included in said plural memory modules by a quotient attained by dividing the first predetermined number by the number of said storage control units.

31. A vector processor according to claim 30, wherein:
said plural banks belonging to each bank group within each memory module are assigned with a plurality of addresses assigned to said plural banks in such a manner that the plurality of addresses are sequentially assigned to different ones of said banks in a predetermined sequence of banks, and are assigned, for every third predetermined number of addresses, to one of said banks different from one of said banks determined according to the sequence of banks.

32. A vector processor according to claim 31, wherein:
the third predetermined number is identical to a value of a quotient attained by dividing the first predetermined number by the number of said plural storage control units.

33. A vector processor according to claim 27, wherein:
the first predetermined number is identical to the number of said plural memory modules.

34. A vector processor according to claim 33, wherein:
said plural bank groups within each memory module are assigned with a plurality of addresses assigned to said each memory module in such a manner that the addresses are sequentially assigned to different ones of said bank groups in a predetermined sequence of bank groups, and are assigned, for every second predetermined number of addresses, to one of said bank groups different from one of said bank groups determined according to the sequence of bank groups.

35. A vector processor according to claim 34, wherein:
the second predetermined number is identical to a value obtained as a quotient by dividing by a total number of said memory modules a result attained by multiplying the total number of said memory bank groups included in said plural memory modules by a quotient attained by dividing the first predetermined number by the number of said storage control units.

36. A vector processor according to claim 35, wherein:
said plural banks belonging to each said bank group are assigned with a plurality of addresses assigned to said each memory module in such a manner that the addresses are sequentially assigned to different ones of said banks in a predetermined sequence of banks, and are assigned, for every third predetermined number of, to one of said banks different from one of said banks determined according to the sequence of banks.

37. A vector processor according to claim 36, wherein:
the third predetermined number is identical to a value of a quotient attained by dividing the first predetermined number by the number of said plural storage control units.

38. A vector processor comprising:
a storage for storing vector data therein, including a plurality (M) of memory modules;
a plurality (N) of requesters for concurrently issuing access requests for a plurality (N) of vector elements belonging to each of a plurality of concurrent element groups obtained by subdividing vector data stored in said storage;
a storage control unit connected to the requesters for transferring a plurality of access requests concurrently supplied from said plural requesters to one or ones of said memory modules to which addresses respectively contained in the access requests belong,
said plural memory modules being sequentially assigned with addresses in such a manner that successive addresses are assigned to different ones of said memory modules, determined according to a first predetermined sequence of memory modules and are assigned, for every first predetermined number of addresses, to one of said memory modules different from one of said memory modules determined according to the sequence of memory modules,
said storage control unit including:
a plurality of priority units each disposed in association with and connected to one of said plural memory modules, each priority unit selecting one of a plurality of access requests supplied to said each priority unit and transmitting the selected access request to a corresponding one of the memory modules; and
a plurality of request send-out units each disposed in association with and connected to one of said requesters belonging to one of said requester groups corresponding to each storage control unit for judging ones of said memory modules to which addresses respectively contained in the access requests respectively supplied from said requesters associated therewith respectively belong and for transmitting the access requests to said priority units respectively disposed in association with said judged memory modules,
each priority unit including:
a plurality of request queues each disposed in association with and connected to one of said plural request send-out units for temporarily holding access requests transmitted from said request send-out units respectively associated therewith to each priority unit; and
means for selecting one of the plural access requests held in said plural request queues and transferring the access request to a memory module corresponding to each priority unit,
each request send-out unit including:
means for judging a memory module to which an address contained in the access request supplied from said associated requester belongs; and
means for controlling, in accordance with whether or not an empty area exists in a request queue disposed in a priority unit related to said judged memory module, whether or not the access request is to be transmitted to said priority unit disposed in association with said judged memory module.

39. A vector processor according to claim 38, wherein:
the first predetermined number is not less than a total number of said memory bank groups included in said plural memory modules.

40. A vector processor according to claim 39, wherein:
said plural bank groups within each memory module is assigned with a plurality of addresses assigned to said each memory module in such a manner that the plurality of addresses are sequentially assigned to different ones of said bank groups in a predetermined sequence of bank groups, and are assigned for every second predetermined number of addresses, to one of said bank groups different from one of said bank groups determined according to the sequence of bank groups.

41. A vector processor according to claim 40, wherein:
the second predetermined number is identical to a value obtained as a quotient by dividing by a total number of said memory modules a result attained by multiplying the total number of said memory bank groups included in said plural memory modules by a quotient attained by dividing the first predetermined number by the number of said storage control unit.

42. A vector processor according to claim 41, wherein:
said plural banks belonging to each bank group within each memory module are assigned with a plurality of addresses assigned to said plural banks in such a manner that the plurality of addresses are sequentially assigned to different ones of said banks in a predetermined sequence of banks, and are assigned for every third predetermined number of addresses, to one of said banks different from one of said banks determined according to the sequence of banks.

43. A vector processor according to claim 42, wherein:
the third predetermined number is identical to a value of a quotient attained by dividing the first predetermined number by the number of said plural storage control unit.

* * * * *